(12) United States Patent
Sánchez De La Fuente et al.

(10) Patent No.: US 12,355,990 B2
(45) Date of Patent: Jul. 8, 2025

(54) DECODER, ENCODER AND METHODS FOR MIXING NAL UNITS OF DIFFERENT NAL UNIT TYPES IN VIDEO STREAMS

(71) Applicant: FRAUNHOFER-GESELLSCHAFT ZUR FÖRDERUNG DER ANGEWANDTEN FORSCHUNG E.V., Munich (DE)

(72) Inventors: Yago Sánchez De La Fuente, Berlin (DE); Karsten Sühring, Berlin (DE); Cornelius Hellge, Berlin (DE); Thomas Schierl, Berlin (DE); Robert Skupin, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 162 days.

(21) Appl. No.: 17/787,267

(22) PCT Filed: Dec. 16, 2020

(86) PCT No.: PCT/EP2020/086523
§ 371 (c)(1),
(2) Date: Jun. 17, 2022

(87) PCT Pub. No.: WO2021/122817
PCT Pub. Date: Jun. 24, 2021

(65) Prior Publication Data
US 2023/0027374 A1    Jan. 26, 2023

(30) Foreign Application Priority Data
Dec. 20, 2019   (EP) .................................... 19219057

(51) Int. Cl.
*H04N 19/169* (2014.01)
*H04N 19/172* (2014.01)
*H04N 19/44* (2014.01)

(52) U.S. Cl.
CPC ......... *H04N 19/188* (2014.11); *H04N 19/172* (2014.11); *H04N 19/44* (2014.11)

(58) Field of Classification Search
CPC .... H04N 19/188; H04N 19/172; H04N 19/44; H04N 19/30; H04N 19/597; H04N 19/70; H04N 19/105; H04N 19/184
See application file for complete search history.

(56) References Cited

U.S. PATENT DOCUMENTS

| | | | |
|---|---|---|---|
| 11,399,188 B2* | 7/2022 | Choi | H04N 19/174 |
| 2015/0103878 A1 | 4/2015 | Ramasubramonian et al. | |
| 2021/0176491 A1* | 6/2021 | Wu | H04L 69/22 |

OTHER PUBLICATIONS

International Search Report dated Apr. 28, 2021, for PCT/EP2020/086523, 5 pp.

(Continued)

*Primary Examiner* — Joseph W Becker
(74) *Attorney, Agent, or Firm* — NIXON & VANDERHYE P.C.

(57) ABSTRACT

The present invention is concerned with decoders, encoders and corresponding methods for handling video data streams (11) comprising a first sub-bitstream (11-1) and a second sub-bitstream (11-2). The herein described concept provides solutions for mixing, within an access unit (30, 31, 32), different NAL units (301, 302, 3030, 304) of different NAL unit types. For example, RAP NAL unit types may be mixed with different IRAP NAL unit types or non-IRAP NAL unit types, and non-IRAP NAL unit types may be mixed with different non-IRAP NAL unit types.

4 Claims, 14 Drawing Sheets

(56) References Cited

OTHER PUBLICATIONS

Written Opinion of the International Searching Authority dated Apr. 28, 2021, for PCT/EP2020/086523, 8 pp.

Y-K Wang (Futurewei) et al: "AHG17/AHG12: On mixed NAL unit types within a picture", 16. JVET Meeting; Oct. 1, 2019-Oct. 11, 2019; Geneva; (The Joint Video Exploration Team of ISO/IEC JTC1/SC29/WG11 and ITU-T SG.16), No. JVET-P0124, Sep. 25, 2019 (Sep. 25, 2019), XP0302 16312, Retrieved from the Internet: URL:http://phenix.int-evry.fr/jvet/doc_end_user/documents/16_Geneva/wgll/JVET-P0124-vl.zipJVET-P0124-vl.docx [retrieved on Sep. 25, 2019] pp. 1-3.

Bross et al; "Working Draft 5 of Versatile Video Coding", 126. MPEG Meeting; Mar. 25, 2019-Mar. 29, 2019; Geneva; (Motion Picture Expert Group or ISO/IEC JTC1/SC29/WG11), No. n18370, Jul. 7, 2019 (Jul. 7, 2019), XP030222340, Retrieved from the Internet: URL:http://phenix.int-evry.fr/mpeg/doc_end_user/documents/126_Geneva/wgll/w18370.zipW18370.docx [retrieved on Jul. 7, 2019] pp. 70-71; tables 7-1.

Choi (Tencent) B et al: "AHG12: On sub-picture design", 14. JVET Meeting; Mar. 19, 2019-Mar. 27, 2019; Geneva; (The Joint Video Exploration Team of ISO/IEC JTC1/SC29/WG11 and ITU-T SG.16), No. JVET-N0055, Mar. 20, 2019 (Mar. 20, 2019), XP030203823, Retrieved from the Internet: URL:http:/phenix.int-evry.fr/jvet/doc_end_user/document/14Geneva/wg11/JVET-N0055-v2.zip_JVET-N0055-v2.docx [retrieved on Mar. 20, 2019] pp. 1-7.

Chen L et al: "AHG17/AHG12: On enabling subpicture with random access properties", 16. JVET Meeting; Oct. 1, 2019-Oct. 11, 2019; Geneva; (The Joint Video Exploration Team of ISO/IEC JTC1/SC29/WG11 and ITU-T SG.16 No. JVET-P0146, Sep. 24, 2019 (Sep. 24, 2019), XP030216350, Retrieved from the Internet: URL:http://phenix.int-evry.fr/jvet/doc_end_user/documents/16Geneva/wgll/JVET-P0146-v1.docx [retrieved on Sep. 24, 2019] pp. 1-4.

Bross, Benjamin et al., Document JCTVC-G1103-d9, Joint Collaborative Team on Video Coding (JCT-VC) of ITU-T SG16 WP3 and ISO/IEC JTC1/SC29/WG11, 7th Meeting: Geneva, CH, Nov. 21-30, 2011, 226 pp.

\* cited by examiner

DECODER, ENCODER AND METHODS FOR MIXING NAL UNITS OF DIFFERENT NAL UNIT TYPES IN VIDEO STREAMS

This application is the U.S. national phase of International Application No. PCT/EP2020/086523 filed Dec. 16, 2020, which designated the U.S. and claims priority to 19219057.7 filed Dec. 20, 2019, the entire contents of each of which are hereby incorporated by reference.

GENERAL DESCRIPTION

Embodiments of the present disclosure relate to a decoder and a corresponding encoder for decoding/encoding a video stream, and in particular a video stream comprising at least two video sub-streams. Said video stream may comprise a plurality of access units, wherein each access unit may comprise at least one picture contained in each of said two or more video sub-streams. Each picture may be associated with a NAL (Network Abstraction Layer) unit of a particular NAL unit type. The herein described innovative concept introduces solutions for mixing NAL units of different NAL unit types.

TECHNICAL BACKGROUND

NAL units may be classified into VCL (Video Coding Layer) and non-VCL NAL units according to whether they contain coded pictures or other associated data, respectively. In the HEVC standard, several VCL NAL unit types identifying categories of pictures for decoder initialization and random-access purposes are included. Using the content of a two-byte NAL unit header, it is possible to readily identify the purpose of the associated payload data.

Video coding techniques enable random access and bitstream splicing. With respect to random access, a bitstream may start with an IDR (Instantaneous Decoding Refresh) access unit. An IDR access unit contains an independently coded picture, i.e., a coded picture that can be decoded without decoding any previous pictures in the NAL unit stream. The presence of an IDR access unit indicates that no subsequent picture in the bitstream will require reference to pictures prior to the picture that it contains in order to be decoded. The IDR picture is used within a coding structure known as a closed GOP (Group Of Pictures). An alternative to the above discussed IDR syntax is provided by CRA (Clean Random Access) picture syntax which specifies the use of an independently coded picture at the location of a RAP or IRAP ((Intra) Random Access Point), i.e., a location in a bitstream at which a decoder can begin successfully decoding pictures without needing to decode any pictures that appeared earlier in the bitstream, which supports an efficient temporal coding order known as open GOP operation.

Good support of random access may be critical for enabling channel switching, seek operations, and dynamic streaming services. Some pictures that follow a CRA picture in decoding order and precede it in display order may contain interpicture prediction references to pictures that are not available at the decoder. These non-decodable pictures may therefore be discarded by a decoder that starts its decoding process at a CRA point. For this purpose, such non-decodable pictures may be identified as RASL pictures (Random Access Skipped Leading). An IRAP picture may be an IDR or CRA picture, wherein a CRA picture may be followed by RASL pictures in the bitstream. RASL pictures can be discarded by the decoder, as they may contain references to pictures that are not actually present in the bitstream, e.g. due to a splicing operation.

A further type of pictures that can follow an IRAP picture in decoding order and precede it in output order is the RADL picture (Random Access Decodable Leading), which may not contain references to any pictures that precede the IRAP picture in decoding order. RASL and RADL pictures may collectively be referred to as leading pictures (LPs). Pictures that follow an IRAP picture in both decoding order and output order are known as trailing pictures (TRAIL). They may not contain any references to LPs for interpicture prediction.

In nowadays video coding, also Temporal Sublayering Support may be given. Therefore, a temporal identifier may be specified in the NAL unit header, which indicates a level in a hierarchical temporal prediction structure. This helps to achieve temporal scalability without the need to parse parts of the bitstream other than the NAL unit header. Under certain circumstances, the number of decoded temporal sublayers can be adjusted during the decoding process of one coded video sequence. The location of a point in the bitstream at which sublayer switching is possible to begin decoding some higher temporal layers can be indicated by the presence of a STSA picture (Stepwise Temporal Sublayer Access). At the location of an STSA picture, it may be possible to switch from decoding a lower temporal sublayer to decoding one particular higher temporal sublayer (but not the further layers above that, unless they also contain STSA pictures).

For multiple-reference picture management, a particular set of previously decoded pictures may be present in the DPB (Decoded Picture Buffer) for the decoding of the remainder of the pictures in a bitstream. To identify these pictures, a list of POC (Picture Order Count) identifiers may be transmitted in each slice header. The set of retained reference pictures is called the RPS (Reference Picture Set). The POC may contain a least significant bit portion (LSB) and a most significant bit portion (MSB) for indicating, for each picture in the bitstream, the respective current picture order count (POC value), wherein the picture order may differ from the decoding order of the respective picture. Thus, decoding pictures after an IRAP picture, which pictures refer to reference pictures that precede the IRAP picture, may be challenging.

Thus, it is desirable to improve existing encoders and decoders which may provide for a proper handling of pictures and sequences of pictures in a bitstream, in particular if appearing after an IRAP picture.

Therefore, it is suggested to provide a decoder having at least the features of the independent claims and a corresponding apparatus for encoding and/or merging having at least the features of the independent claims. Yet further, it is suggested to provide corresponding methods of encoding and decoding, respectively, as well as corresponding computer program products and bitstreams. Advantageous embodiments are presented in the dependent claims.

As mentioned above, a bitstream may comprise pictures being associated with an IRAP NAL unit type, which pictures may also be referred to as IRAP-pictures, as well as pictures that are not associated with an IRAP NAL unit type, i.e. associated with a non-IRAP NAL unit type, which pictures may also be referred to as non-IRAP pictures.

According to an aspect, a decoder for decoding video content is provided, the decoder being configured to decode a bitstream comprising a first sub-bitstream relating to a first spatial segment of pictures of the video content and a second sub-bitstream relating to a second spatial segment of the pictures of the video content. In this case, the bitstream comprises at least one access unit in which at least one first NAL unit of the first sub-bit-stream is of a non-IRAP NAL unit type, for instance RASL, RADL, TRAIL, STSA. The at least one access unit further comprises at least one different second NAL unit of the second sub-bitstream which is of a non-IRAP NAL unit type, for instance RASL, RADL, TRAIL, STSA, wherein the first NAL unit of the first sub-bitstream and the second NAL unit of the second sub-bitstream are mixed. In other words, a non-IRAP NAL unit is mixed with a different non-IRAP NAL unit. For example, a NAL unit of a TRAIL-picture NAL unit type may be mixed with a NAL unit of a RASL-picture NAL unit type. According to this non-limiting example, within one access unit, a TRAIL-picture of the first sub-bitstream may be mixed with a RASL-picture of the second sub-bitstream. Other non-limiting examples may allow mixing, within one access unit, a TRAIL-picture of the first sub-bitstream with a RADL-picture of the second sub-bitstream. Some further non-limiting examples may allow mixing, within one access unit, a TRAIL-picture of the first sub-bitstream with an STSA-picture of the second sub-bitstream. Some further non-limiting examples may allow mixing, within one access unit, an STSA-picture of the first sub-bitstream with a RADL-picture of the second sub-bitstream. Some further non-limiting examples may allow mixing, within one access unit, an STSA-picture of the first sub-bitstream with a RASL-picture of the second sub-bitstream. Some further non-limiting examples may allow mixing, within one access unit, a RASL-picture of the first sub-bitstream with a RADL-picture of the second sub-bitstream.

According to a further aspect, a decoder for decoding video content is provided, the decoder being configured to decode a bitstream comprising a first sub-bitstream relating to a first spatial segment of pictures of the video content and a second sub-bitstream relating to a second spatial segment of the pictures of the video content. In this case, the bitstream comprises at least one access unit within which at least one first NAL unit of the first sub-bitstream is of an IRAP NAL unit type that is mixed with at least one second NAL unit of the second sub-bitstream which is of a further IRAP NAL unit type. In other words, a first IRAP NAL unit is mixed with a further second IRAP NAL unit. Said further second IRAP NAL unit may be of the same NAL unit type as the first IRAP NAL unit, or it may be of a different NAL unit type than the first IRAP NAL unit. For example, a NAL unit of a CRA-picture NAL unit type may be mixed with a further picture of the same NAL unit type, e.g. with a further CRA-picture NAL, or with a further picture of a different NAL unit type, e.g. a NAL unit of an IDR-picture NAL unit type with a leading picture, i.e. an IDR-with-RADL-Picture unit type (IDR_W_RADL). According to this non-limiting example, within one access unit, a CRA-picture of the first sub-bitstream may be mixed with a further CRA-picture of the second sub-bitstream or with an IDRW_RADL-picture of the second sub-bitstream.

According to a further aspect, a decoder for decoding video content is provided, the decoder being configured to decode a bitstream comprising a first sub-bitstream relating to a first spatial segment of pictures of the video content and a second sub-bitstream relating to a second spatial segment of the pictures of the video content. In this case, the bitstream comprises at least one access unit within which at least one first NAL unit of the first sub-bitstream is of an IRAP NAL unit type that is mixed with at least one second NAL unit of the second sub-bitstream which is of either one of a non-IRAP Leading Picture NAL unit type (e.g. RASL or RADL) or an STSA NAL unit type. In other words, within one access unit, an IRAP NAL unit (IDR_W_RADL or CRA) is mixed with a non-IRAP NAL unit, wherein the non-IRAP NAL unit is either one of a RASL-picture, a RADL-picture or an STSA-picture.

According to a further aspect, a decoder for decoding video content is provided, the decoder being configured to decode a bitstream comprising a first sub-bitstream and a second sub-bitstream, and wherein the decoder is configured to derive from a slice header of a NAL unit of the first and second sub-bitstreams, which NAL unit is of an IRAP NAL unit type (e.g. CRA, IDR_W_RADL), information for setting a most significant POC portion of the POC of a picture which the NAL unit refers to. In this example, the most significant POC portion is required to be set to a predetermined value for all NAL units of the IRAP NAL unit type within an access unit of the bitstream, if at least one NAL unit within said access unit is of a non-Instantaneous Decoding Refresh (non-IDR) unit type. In other words, if at least one NAL unit inside an access unit refers to a non-IDR picture, for instance to a CRA-picture, then the most significant POC portion is required to be set to said predetermined value. As a non-limiting example, said predetermined value may be equal to or greater than a most significant POC portion of a POC being associated with a picture preceding the picture which the NAL unit refers to. In other words, no POC reset may occur if a non-IDR picture is present inside an access unit.

According to a further aspect, a decoder for decoding video content is provided, the decoder being configured to decode a bitstream comprising a first sub-bitstream and a second sub-bitstream, and wherein the decoder is configured to derive from a slice header of a NAL unit of the first and second sub-bitstreams, which NAL unit is of an IRAP NAL unit type (e.g. CRA, IDR_W_RADL), information for setting a most significant POC portion of the POC of a picture which the NAL unit refers to. In this example, any picture referencing is disallowed to cross, in decoding order, any access unit of the bitstream within which all NAL units are of an IRAP NAL unit type and have a slice header in which the most significant POC portion is set to a predetermined value. In other words, if each picture inside an access unit may refer to an IRAP NAL unit type (e.g. CRA or IDR_W_RADL) and may have a most significant POC portion that is set to said predetermined value, then any picture referencing from reference pictures preceding said access unit may not be allowed. As a non-limiting example, said predetermined value may be smaller than a most significant POC portion of a POC associated with a picture preceding the picture which the NAL unit refers to. The predetermined value may be smaller if, for instance, a reset of the most significant POC portion occurred. Thus, according to the above mentioned non-limiting example, if an access unit may comprise IRAP-pictures only and if a reset of the most significant POC portion occurred, then picture referencing by referring to preceding reference pictures may be disallowed.

According to a further aspect, a decoder for decoding video content is provided, the decoder being configured to decode a bitstream comprising a first sub-bitstream and a second sub-bitstream, and wherein the decoder is configured to derive from a slice header of a NAL unit of the first and second sub-bitstreams, which NAL unit is of an IRAP NAL unit type (e.g. CRA, IDR_W_RADL), information for setting a most significant POC portion of the POC of a picture which the NAL unit refers to. In this example, any picture referencing of reference pictures of a first access unit which consists of NAL units with slice headers in which the most significant POC portion is set to a first predetermined value and which precede, in bitstream order, a second access unit of the bitstream within which all NAL units are of an IRAP NAL unit type and have a slice header in which the most significant POC portion is set to a second predetermined value, by pictures which follow, in the bit stream order, the second access unit of the bitstream, is disallowed. According to a nonlimiting example, said first predetermined value may be greater than said second predetermined value. In other words, if the first predetermined value of the most significant POC portion of the first (preceding) access unit is greater than the second predetermined value of the most significant POC portion of the second access unit, then it may not be allowed that pictures following the second access unit may refer to reference pictures preceding said second access unit.

According to further aspects, respective corresponding encoders, methods for encoding and methods for decoding are suggested.

According to a further aspect, computer programs are provided, wherein each of the computer programs is configured to implement one of the herein described methods when being executed on a computer or signal processor, so that the herein described methods are implemented by one of the computer programs.

In the following, embodiments of the present disclosure are described in more detail with reference to the figures, in which FIG. 1 shows a schematic view of a bitstream that may be processed by an inventive decoder and apparatus for encoding/merging according to an embodiment, FIG. 2 shows a schematic view of a bitstream having access units with IDR_N_LP NAL unit type while all other access units have the same NAL unit type, FIG. 3 shows a schematic view of a bitstream having access units with IDR_W_LP NAL unit type and corresponding RADL unit type mixed with TRAIL unit types, FIG. 4 shows a schematic view of a bitstream having access units with CRA NAL unit type and corresponding RASL unit type mixed with TRAIL unit types, FIG. 5 shows a full 360-degree low resolution thumbnail with selective high-resolution tiles, FIG. 6 shows an exemplary coding structure where in one tile (top example), a picture uses a STSA NAL unit type to indicate step-wise temporal sublayer access, while the same picture in another tiles (bottom example) uses a RASL NAL unit type, FIG. 7 shows an exemplary coding structure for high-resolution area (top) using a closed GOP structure and high-resolution areas (bottom) using open GOP structures, FIG. 8 shows an exemplary coding structure of a multi layer bitstream with POC MSB reset at layer-aligned RAP pictures, FIG. 9 shows an exemplary coding structure of a Multi layer bitstream with POC MSB reset disallowed if not all NAL units IDR, FIG. 10 shows an exemplary coding structure of a Multi layer bitstream with POC MSB reset allowed since all NAL units IDR, FIG. 11 shows an exemplary coding structure of a Multi layer bitstream with POC MSB reset and LT references disallowed, FIG. 12 shows an exemplary coding structure of a Multi layer bitstream with all POC MSB equal to 0 and LT references disallowed, FIG. 13 shows an exemplary coding structure of a Multi layer bitstream with all POC MSB equal to 0 and LT references allowed, and FIG. 14 shows an exemplary coding structure of a Multi layer bitstream with no POC MSB reset and LT references allowed.

DESCRIPTION OF THE FIGURES

Equal or equivalent elements or elements with equal or equivalent functionality are denoted in the following description by equal or equivalent reference numerals.

Method steps which are depicted by means of a block diagram and which are described with reference to said block diagram may also be executed in an order different from the depicted and/or described order. Furthermore, method steps concerning a particular feature of a device may be replaceable with said feature of said device, and the other way around.

Mixing NAL Unit Types in Picture and Access Units

1. Mixing Unit Types Within a Coded Picture

Figure 1:
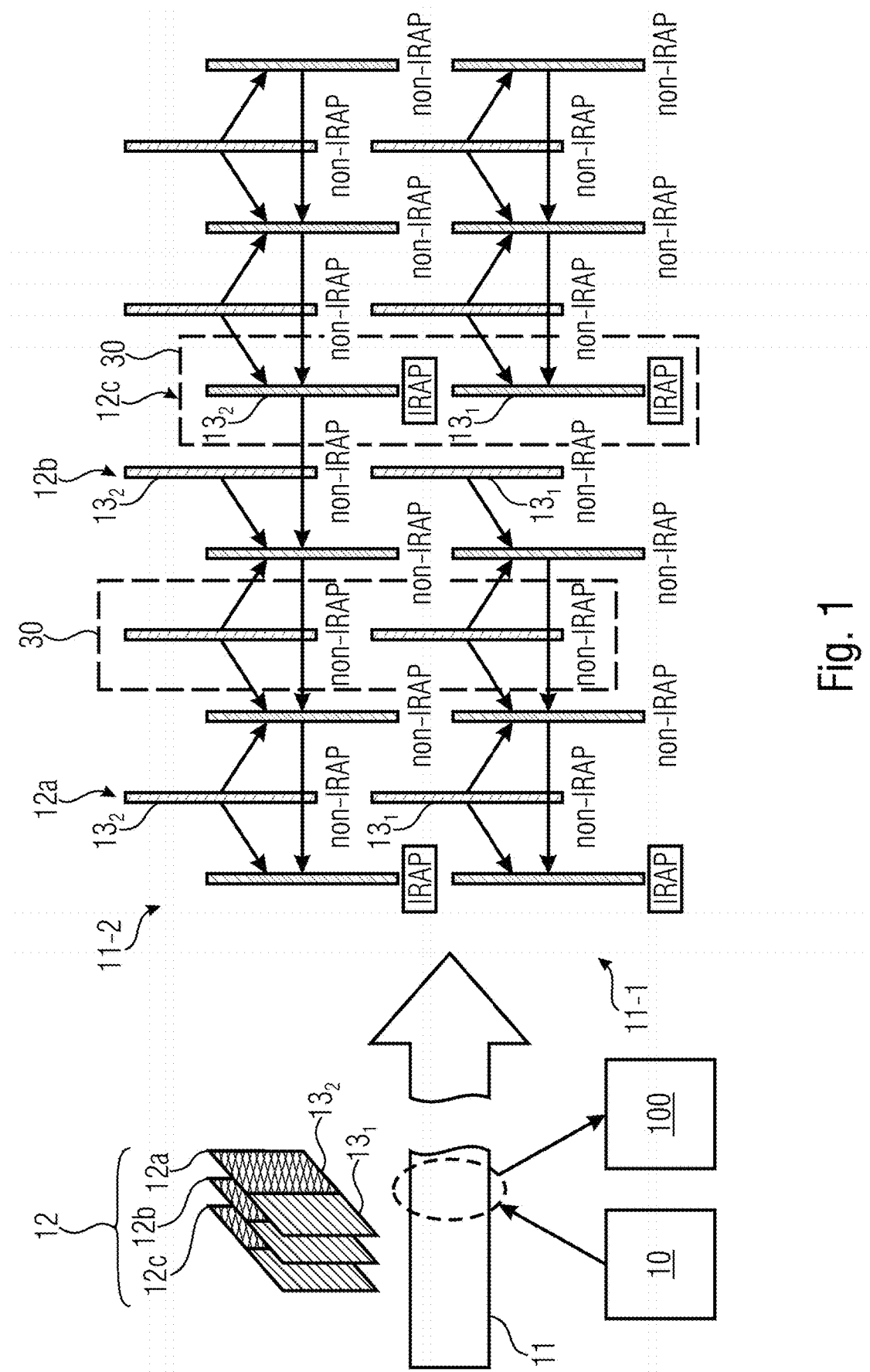

FIG. 1 shows, for introductory purposes, a structure of an exemplary video bitstream 11 that can be processed by decoders 100 and apparatuses 10 for encoding and/or merging the video bitstream 11, according to embodiments of the present invention. The video bitstream 11 comprises a sequence of consecutive pictures 12a, 12b, 12c, wherein two or more of said consecutive pictures 12a, 12b, 12c may be grouped together in a GOP (Group of Pictures) 12 which may represent at least part of an intended video content.

For the purpose of coding, each picture 12a, 12b, 12c may be subdivided into spatial segments, e.g. slices, tiles or blocks. In this non-limiting example, the pictures 12a, 12b, 12c are each subdivided into two spatial segments, namely into a first (e.g. a left) spatial segment $13_1$ and a second (e.g. a right) spatial segment 132.

The bitstream 11 may be subdivided into a first sub-bitstream 11-1 relating to the first spatial segment $13_1$ of the pictures 12a, 12b, 12c and into a second sub-bitstream 11-2 relating to the second spatial segment 132 of the pictures 12a, 12b, 12c.

Some pictures 12a, 12b may be dependently coded, e.g. by means of predictive coding. Some of these pictures 12b may be predicted by uniprediction, e.g. by referring to a single preceding picture, while some other pictures 12a may be predicted by biprediction, e.g. by referring to a preceding and a succeeding picture. Some other pictures 12c may be independently coded, i.e. these pictures 12c may not refer to a preceding or succeeding picture. Independently coded pictures 12c may provide an (Intra) Random Access Point ((I)RAP) which represents a location in the bitstream 11 at which a decoder may begin to decode subsequent pictures without the need to decode any pictures that appeared earlier in the bitstream 11. For example, picture 12c is an independently coded picture that may also be referred to as an (I)RAP picture. In the present disclosure, the terms RAP and IRAP may be used synonymously.

The bitstream 11 may comprise one or more access units 30 for accessing the bitstream 11. In the non-limiting example of FIG. 1, an access unit 30 may comprise aligned (with respect to the presentation order) picture segments $13_1$, $13_2$ contained in the first and second sub-bitstream 11-1, 11-2. The pictures 12a, 12b, 12c comprising these aligned picture segments 131, 132, respectively, may be grouped into different categories, e.g. into IRAP-pictures (as mentioned above) and non-IRAP-pictures.

The Network Abstraction Layer (NAL) may provide a High Level Syntax for defining those picture segments $13_1$, $13_2$ and pictures 12a, 12b, 12c. In particular, the NAL units may be associated with said picture segments $13_1$, $13_2$ for each of said pictures 12a, 12b, 12c. Thus, in the present disclosure, the above mentioned picture segments $13_1$, $13_2$ of the first and second sub-bitstreams 11-1, 11-2 may also be synonymously referred to as NAL units. Accordingly, the first and second sub-bitstreams 11-1, 11-2 may also be referred to as NAL unit streams. Each NAL unit $13_1$, $13_2$ may comprise a particular NAL unit type. The NAL unit type, in turn, may identify the aforementioned category of the respective picture contained in the NAL unit, i.e. whether the respective NAL unit is of an IRAP-type or of a non-IRAP-type.

There are multiple applications that rely on mixing IRAP types within a picture, wherein an IRAP type is the random access property of an Access Unit (AU) 30, or part thereof, indicated through the NAL unit type. Use cases can be found in the single or multi-layer codec domain, i.e. either a single-layer codec bitstream of which a picture consists of slices that are IRAP while other slices of the same pictures are not, or, a multi-layer codec bitstream of which an access unit contains a IRAP in one layer while the other layers contain a non-IRAP picture.

Currently, support for mixed NAL unit types is given in the prior art where a single type of an IRAP NAL unit type can be mixed within a picture with a TRAIL picture. However, this does not cover the use-cases properly that motivate the need for such a feature as described in the following and for which the current invention provides solutions.

The main use case to motivate the need for mixed NAL unit types is 360° video, where tile streaming is used and only a subset of the whole 360° is transmitted at high resolution and the rest at low resolution. When a change in the viewing orientation happens, then some tiles at high resolution are not any longer required, while new tiles that were shown at low resolution are required at high resolution from this time instance onwards. These tiles are the only ones that encounter a change (from high resolution to low resolution and vice versa). These tiles are then downloaded using a representation that starts with an IRAP while others do not need to have this property. When merging the bitstreams corresponding to the different tiles into a single bitstream some of the tiles contain NAL unit types corresponding to IRAP pictures while others contain NAL unit types of a non-IRAP picture.

Besides, there are some other use-cases in which it is desirable to allow an AU to have NAL units with different types. For instance, in a scenario of RoI (Region of Interest) where there is a 1080p picture with a RoI inside of 720p, one could envision that the different parts (RoI or rest) of the video have different RAP periods, for the case that the same bitstream is used for feeding two types of receivers, e.g. one being interested on the whole video and the other being only interested on the RoI.

In any of the cases, 360° video streaming where merging of different bitstreams happen or RoI streaming where the video is originally coded into different parts with different RAP periods for the different regions, the decoder would encounter a bitstream for which NAL units within a coded picture are not necessarily the same. Therefore, the present invention provides a solution for mixing NAL units of different NAL unit types.

1.1. Mixing Trailing Pictures (Prior Art)

The solution that is currently proposed in the prior art is that a PPS flag indicates whether a RAP picture is mixed with a non-RAP picture and then the NAL unit types that can be encountered in the NAL units of a mixed AU are TRAIL NAL unit types (up to VCL_RSV_6 or GDR) for the non-IRAP types and a single one type of IDR_W_RADL (IDR with Leading Pictures), IDR_N_LP (IDR with No Leading Pictures) and CRA (Clean Random Access). Accordingly, prior art suggests to mix an IRAP picture with a TRAIL picture.

Figure 2:
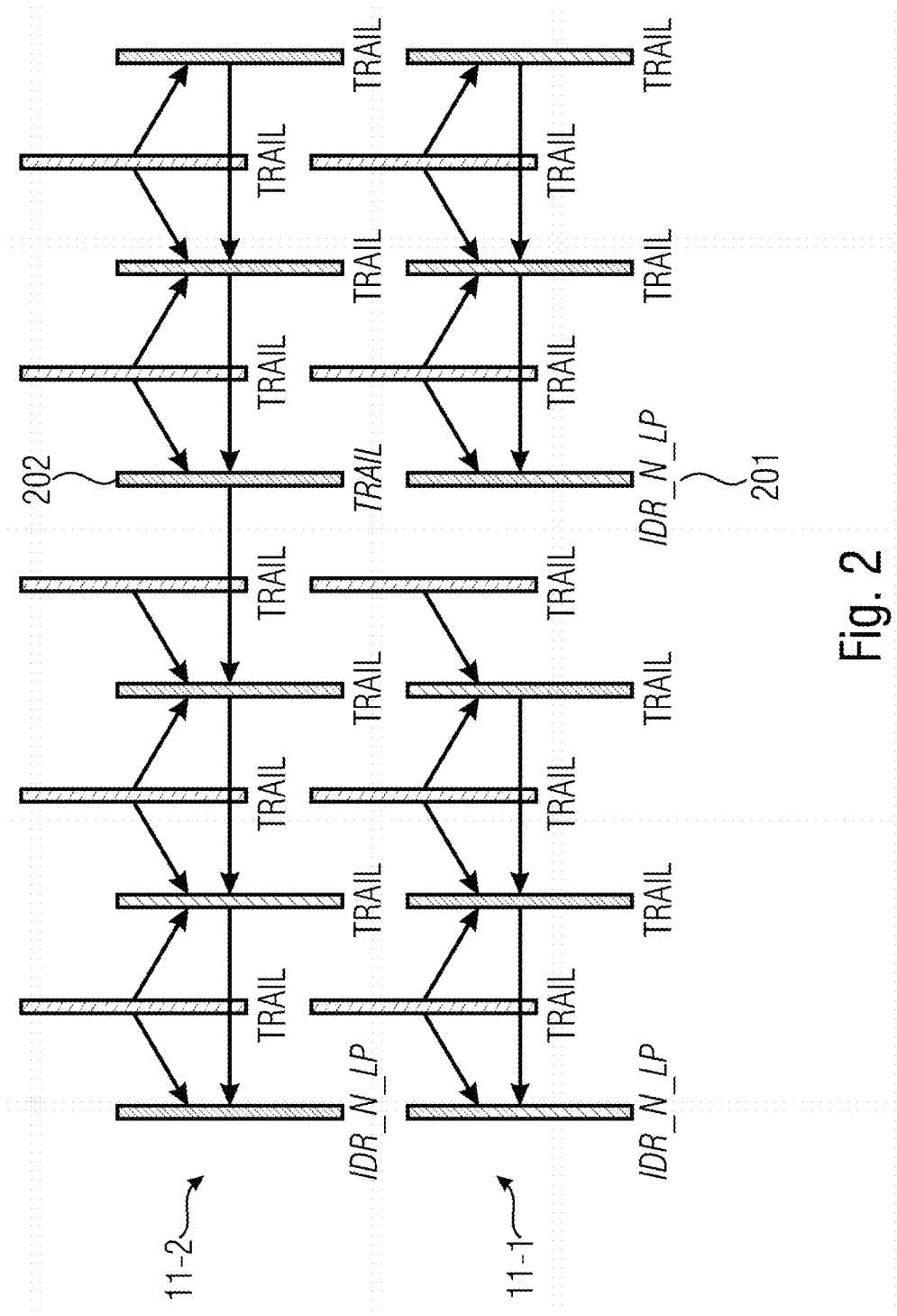

FIG. 2 shows an example according to the prior art, wherein a NAL unit 201 of an IRAP NAL unit type is mixed with a NAL unit 202 of a Trailing Picture type (TRAIL). The IRAP NAL unit type in this example is an IDR with No Leading Picture (IDR_N_LP). All other access units have NAL units of the same NAL unit type (i.e. TRAIL).

1.2. Mixing Leading Pictures

Figure 3:
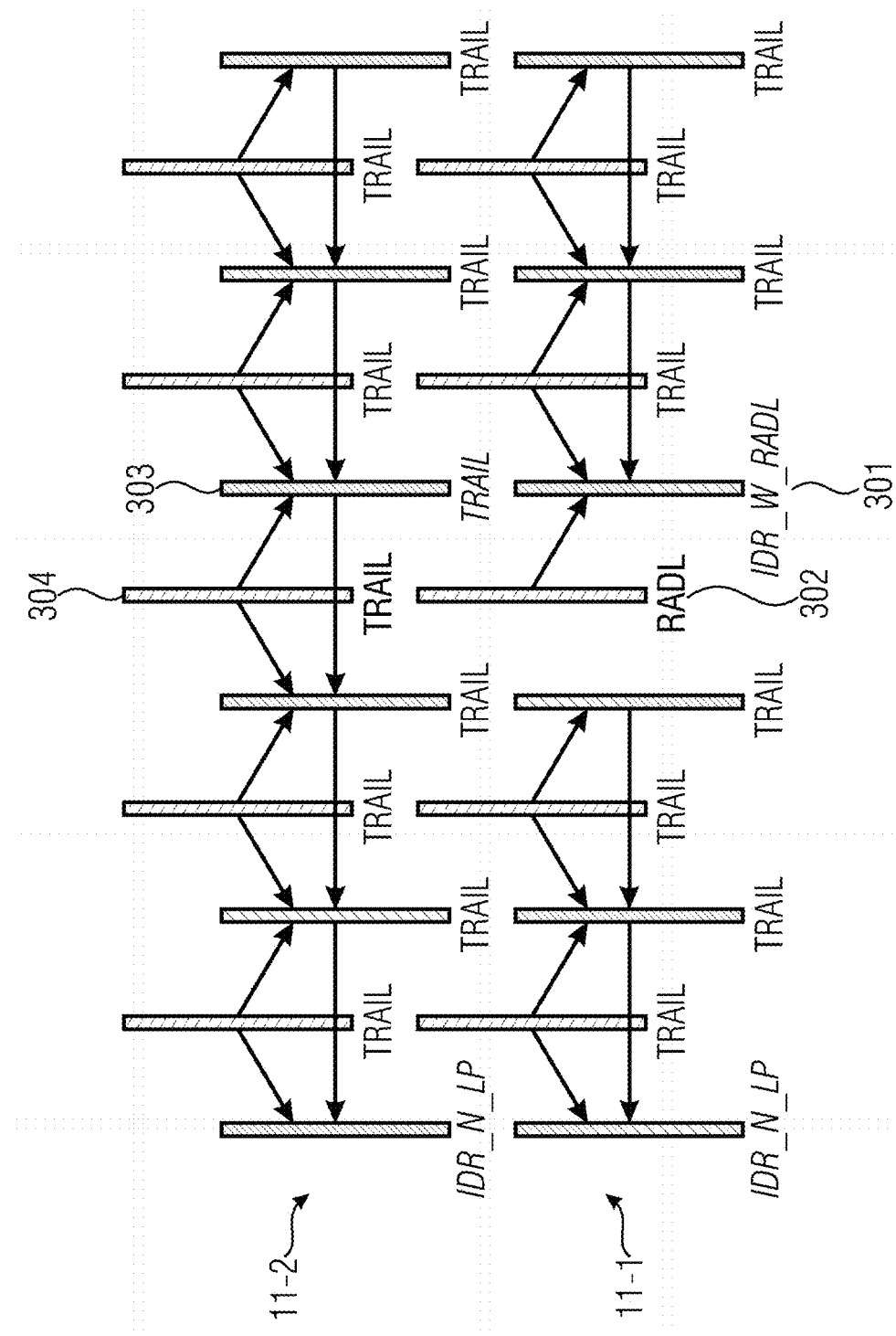

However, these measures do not suffice for the envisioned application where open GOP structures may be applied introducing Leading Pictures (LPs). FIG. 3 shows an exemplary case in which a NAL unit 301 of an IRAP NAL unit type (e.g. IDR_W_RADL) is shown along with its associated leading picture 302, which in this case may be a NAL unit 302 of the NAL unit type RADL (Random Access Decodable Leading Picture). The NAL unit 301 of the IRAP type (e.g. IDR_W_RADL) may be mixed with a NAL unit 303 of a non-IRAP NAL unit type (e.g. TRAIL). The associated NAL unit 302 of the Leading Picture type (RADL), which is a non-IRAP type, may be mixed with a NAL unit 304 of a different non-IRAP type (e.g. TRAIL).

Figure 4:
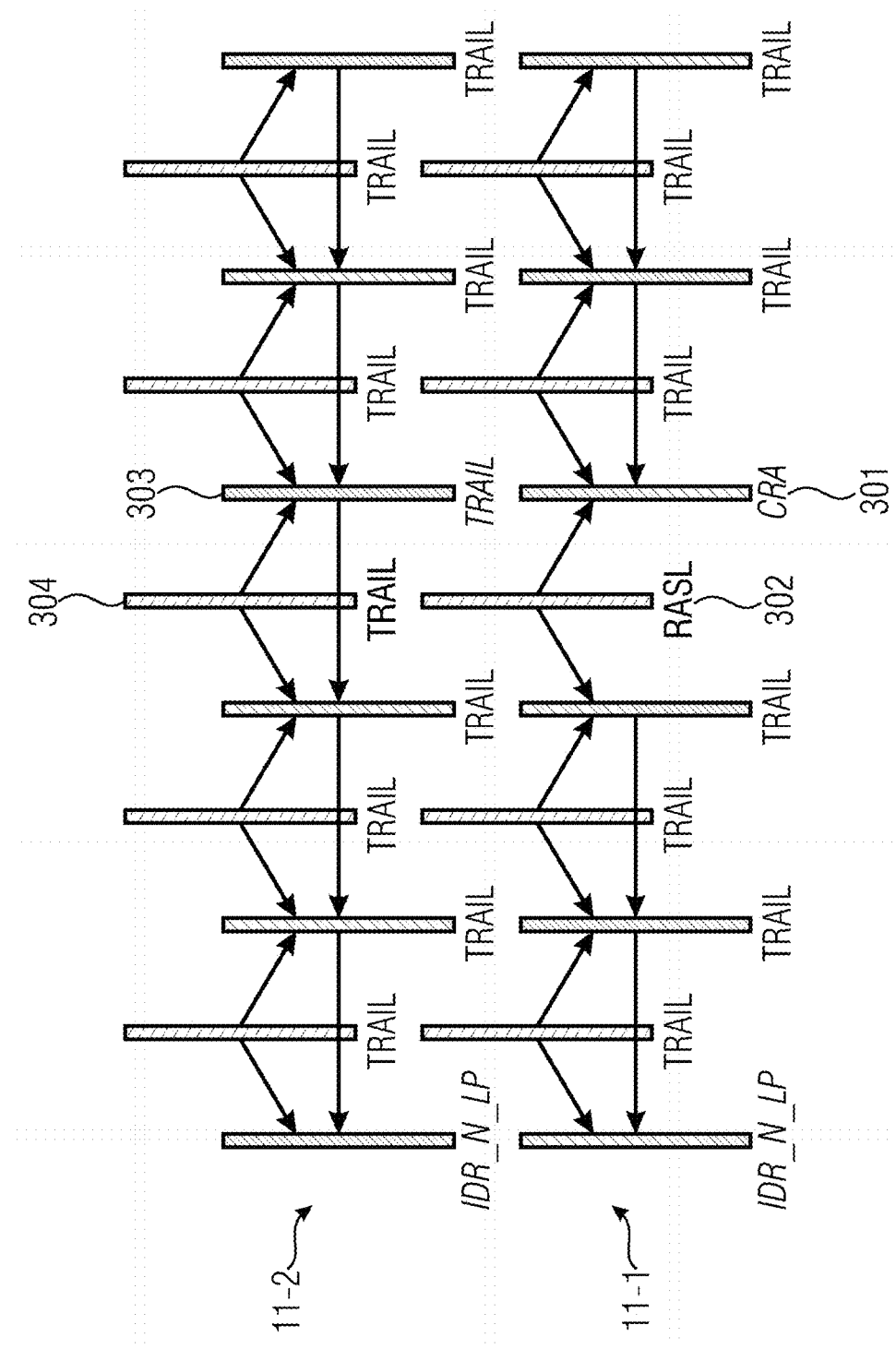

FIG. 4 shows a further exemplary case in which a NAL unit 301 of an IRAP NAL unit type (e.g. CRA) is shown along with its associated leading picture 302, which in this case may be a NAL unit 302 of the NAL unit type RASL (Random Access Skipped Leading Picture). Alternatively, but not shown, the associated leading picture 302 may be a NAL unit 302 of the NAL unit type RADL (Random Access Decodable Leading Picture). The NAL unit 301 of the IRAP type (e.g. CRA) may be mixed with a NAL unit 303 of a non-IRAP NAL unit type (e.g. TRAIL). The associated NAL unit 302 of the Leading Picture type (e.g. RASL), which is a non-IRAP type, may be mixed with a NAL unit 304 of a different non-IRAP type (e.g. TRAIL).

Therefore, it is necessary to deal with coded pictures entailing mixed NAL unit types not only for the case where an IRAP NAL unit is included but also for only non-IRAP NAL units included in the mixed picture.

Briefly summarizing, the prior art may suggest to mix IRAP NAL units with non-IRAP NAL units of the TRAIL-type, or to mix non-IRAP NAL units of the same type, i.e. a NAL unit of the TRAIL type with a NAL unit of the TRAIL type.

The present invention instead suggests to mix a first non-IRAP NAL unit type (e.g. RASL, RADL, TRAIL, STSA) with at least one different second non-IRAP NAL unit type (e.g. RASL, RADL, TRAIL, STSA).

Thus, according to an embodiment, a decoder 100 is provided for decoding video content 12, the decoder 100 being configured to decode a bitstream 11 comprising a first sub-bitstream 11-1 relating to a first spatial segment 13₁ of pictures 12a, 12b, 12c of the video content 12 and a second sub-bitstream 11-2 relating to a second spatial segment 13₂ of the pictures 12a, 12b, 12c of the video content 12. According to this embodiment, the bitstream 11 comprises at least one access unit 30 within which at least one first NAL unit 302 of the first sub-bitstream 11-1 is of a non-IRAP NAL unit type (e.g. RASL, RADL, TRAIL, STSA) that is mixed with at least one different second NAL unit 304 of the second sub-bitstream 11-2 which is of a different non-IRAP NAL unit type (e.g. RASL, RADL, TRAIL, STSA).

For example, TRAIL pictures may be mixed with RADL pictures or RASL pictures:
TRAIL+RADL
TRAIL+RASL Thus, according to an embodiment, the decoder 100 may be configured to process the bitstream 11 in which the non-IRAP NAL unit type of the NAL unit 302 of the first sub-bitstream 11-1 is a Random Access Decodable Leading Picture unit type (RADL) and the non-IRAP NAL unit type of the NAL unit 304 of the second sub-bitstream 11-2 is a Trailing Picture unit type (TRAIL).

According to a further embodiment, the decoder 100 may be configured to process the bitstream 11 in which the non-IRAP NAL unit type of the NAL unit 302 of the first sub-bitstream 11-1 is a Random Access Skipped Leading Picture unit type (RASL) and the non-IRAP NAL unit type of the NAL unit 304 of the second sub-bitstream 11-2 is a Trailing Picture unit type (TRAIL).

In one embodiment of the invention, there is an indication in the bitstream 11, e.g. as a flag in a parameter set (PPS, SPS, VPS) that NAL unit types within a coded picture can be mixed as follows:
TRAIL+RADL
TRAIL+RASL Such a signalling could be carried in the PPS as for indicating that TRAIL+(CRA xor IDR_W_LD xor IDR_N_P) can be mixed.

For example, if the flag is not set (i.e. flag=0), all NAL units of a picture may comprise the same NAL unit type and a picture or a PU is referred to as having the same NAL unit type as the coded slice NAL units of the picture or PU.

Otherwise, if the flag is set (i.e. flag =1), the picture may comprise at least two subpictures. Additionally or alternatively, the NAL units of said picture may comprise at least two different NAL unit types. Further additionally or alternatively, no NAL unit of said picture may comprise a NAL unit type of GDR. Still further additionally or alternatively, if one NAL unit of said picture is of at least one of the following NAL unit types:
Instant Decoder Refresh with Random Access Decoded Leading Picture (I DR_W_RADL)
Instant Decoder Refresh with No Leading Picture (IDR_N_LP)
Clean Random Access (CRA)
then all other available NAL units of said picture may comprise one of the above noted three unit types (IDR_W_RADL, IDR_N_LP, CRA) or a trailing picture unit type (TRAIL).

Alternatively, since RADL and RASL picture do not have a normative decoding process different from TRAIL pictures, as for instance the IRAP pictures have, this indication could be done at SPS level. In one embodiment, for instance, the indication could have the form of a constraint flag, e.g. a general constraint flag. The general constraint flag may indicate whether certain mixes of NAL unit types are allowed. If such a general constraint flag is set (i.e. general constraint flag=1), it may indicate that there are no mixed NAL unit types in a picture and that the above mentioned flag in the parameter set (PPS, SPS, VPS) is not set (i.e. flag=0). If the general constraint flag is not set (i.e. general constraint flag=0) the above mentioned constraints may not be imposed.

Thus, according to an embodiment, the decoder 100 may be configured to derive an indication from the bitstream 11, wherein said indication explicitly signals towards the decoder 100 that the NAL unit 304 of the non-IRAP NAL unit type of the second sub-bitstream 11-2, which NAL unit 304 is of a Trailing Picture unit type (TRAIL), is mixed with the NAL unit 302 of the non-I RAP NAL unit type of the first sub-bitstream 11-1, which NAL unit 302 is either one of the Random Access Skipped Leading Picture unit type (RASL) or the Random Access Decodable Leading Picture unit type (RADL).

According to an embodiment, the indication may comprise a syntax element in a parameter set. For example, the syntax element may be contained in at least one of a Picture Parameter Set (PPS) or a Sequence Parameter Set (SPS).

However, when tiles with RASL properties and tiles of TRAIL pictures are mixed within a picture, assuming a 360-degree video tile based streaming scenario, it may happen that tiles change position at partial RAP points and hence, RASL tiles cannot be correctly reconstructed as the used reference pictures would not be correct (i.e. still depicting content of other tiles). It is vital for the applications to recognize those faulty reconstructed picture areas, while dropping the whole mixed leading picture (containing TRAIL+RASL tiles) is also not an option for reason of playout continuity. Instead, a client is to recognize the faulty areas in the decoded and output picture and not use those for subsequent processing.

Figure 5:
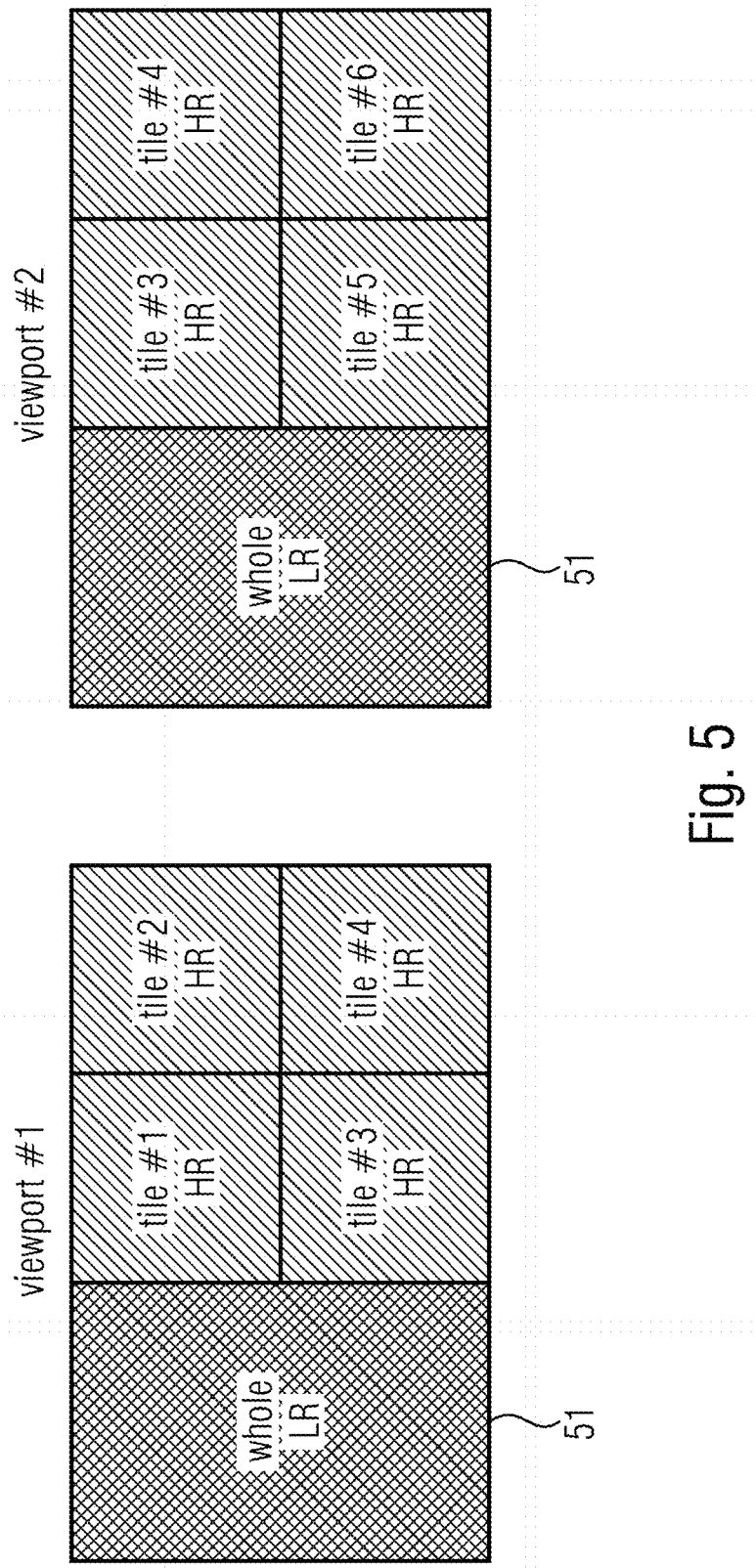

Instead, given for instance a setup as illustrated in FIG. 5, a client could use a low-resolution version 51 contained in the picture for the content that is reconstructed incorrectly in those mixed leading pictures. In one embodiment, the areas corresponding to the potentially faulty reconstructed tiles are indicated to the subsequent processing, e.g. through an SEI message or indicated by external means, e.g. application. The described indication would mean that areas corresponding to NAL units with a NAL unit type of RASL are to be ignored/non-output.

Thus, according to an embodiment, if the NAL unit 302 of the non-IRAP NAL unit type of the first sub-bitstream 11-1 is a Random Access Skipped Leading Picture unit type (RASL) and the non-IRAP NAL unit type of the NAL unit 304 of the second sub-bitstream 11-2 is a Trailing Picture unit type (TRAIL), then the decoder 100 may be configured to derive an indication from the bitstream 11.

In one example, this indication may indicate towards the decoder 100 to ignore or refrain from outputting those first spatial segment 13₁ of pictures 12a, 12b, 12c of the video content 12 of the first sub-bitstream 11-1 which corresponds to said NAL unit 302 of the Random Access Skipped Leading (RASL) Picture unit type of the first sub-bitstream 11-1.

In an alternative example, this indication may indicate towards the decoder 100 to output those first spatial segment 13₁ of pictures 12a, 12b, 12c of the video 12 content of the first sub-bitstream 11-1 which corresponds to said NAL unit 302 of the Random Access Skipped Leading Picture unit type (RASL) of the first sub-bitstream 11-1, and to additionally mark said first spatial segment 13₁ as a broken spatial segment. For instance, the decoder 100 may be configured to mark said broken spatial segment 131 towards a subsequent processing chain by means of an SEI (Supplemental Enhancement Information) message.

Further, another option, is to avoid that RASL pictures are mixed with trailing pictures (TRAIL) at all and thus only allowing RADL pictures to be mixed with TRAIL pictures.

Therefore, in one embodiment, there is a constraint indicated in the SPS, that when a CRA is mixed with TRAIL pictures, the associated leading pictures must be of RADL type only.

Thus, according to an embodiment, the decoder 100 may be configured to decode a constraint indication from a Parameter Set, wherein said constraint indication indicates towards the decoder 100 that if the non-IRAP NAL unit type of the NAL unit 304 of the second sub-bitstream 11-2 is of a non-Leading Picture NAL unit type (e.g. TRAIL or STSA), then the non-IRAP NAL unit type of the NAL unit 302 of the first sub-bitstream 11-1 is of the Random Access Decodable Leading RADL Picture unit type exclusively if its associated IRAP-NAL unit 301 of the first sub-bitstream 11-1 is of the Clean Random Access unit type (CRA).

This may particularly hold true for an embodiment, wherein the non-IRAP NAL unit type of the NAL unit 304 of the second bitstream 11-2 is of the Trailing Picture unit type (TRAIL), i.e. in case of mixing TRAIL+CRA with associated RADL Leading Picture.

In the previous aspects the focus was primarily on TRAIL NAL unit type. However, in many cases there might be also STSA NAL unit types, allowing step-wise temporal sublayer access. That is, even though the above mentioned examples were primarily concerned with non-TRAP NAL units of the TRAIL NAL unit type, the present invention may also provide solutions for mixing non-IRAP NAL units of the STSA (Stepwise Temporal Sublayer Access) unit type with at least one of the RASL unit type, the RADL unit type and the TRAIL unit type, i.e.:

STSA +RASL
STSA +RADL
STSA +TRAIL

Thus, according to an embodiment, the decoder 100 may be configured to decode a bitstream 11 wherein the non-IRAP NAL unit type of the NAL unit 302 of the first sub-bitstream 11-1 is a Stepwise Temporal Sublayer Access unit type (STSA) and the non-IRAP NAL unit type of the NAL unit 304 of the second sub-bitstream 11-2 is a Trailing Picture unit type (TRAIL).

In a further embodiment, the decoder 100 may be configured to decode a bitstream 11 wherein the non-IRAP NAL unit type of the NAL unit 302 of the first sub-bitstream 11-1 is a Random Access Decodable Leading Picture unit type (RADL) and the non-IRAP NAL unit type of the NAL unit 304 of the second sub-bitstream 11-2 is a Stepwise Temporal Sublayer Access unit type (STSA).

In a further embodiment, the decoder 100 may be configured to decode a bitstream 11 wherein the non-IRAP NAL unit type of the NAL unit 302 of the first sub-bitstream 11-1 is a Random Access Skipped Leading Picture unit type (RASL) and the non-IRAP NAL unit type of the NAL unit 304 of the second sub-bitstream 11-2 is a Stepwise Temporal Sublayer Access unit type (STSA).

Figure 6:
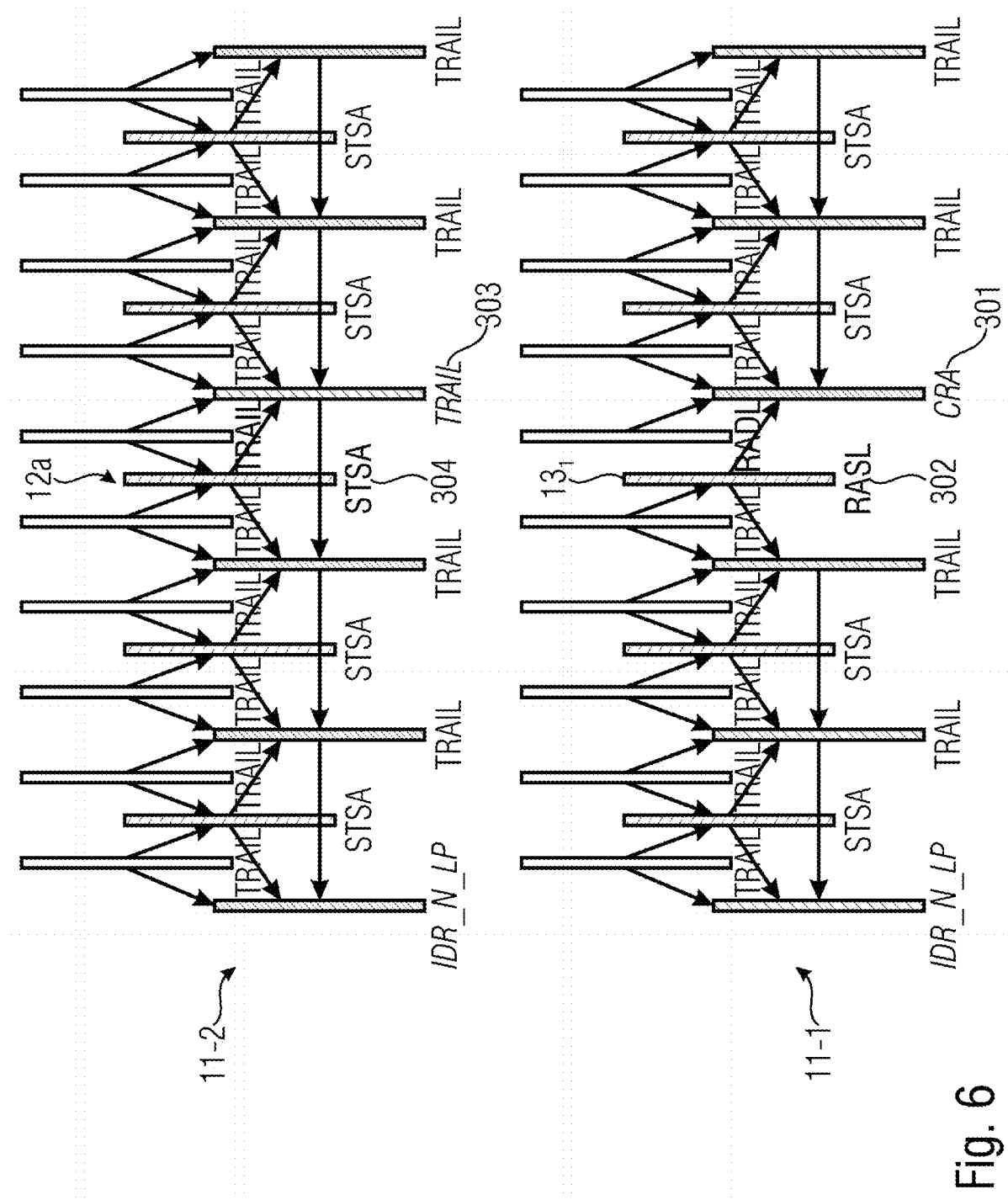

FIG. 6 shows an exemplary coding structure where in one picture segment 132 (e.g. tile), a picture 12a uses a NAL unit 304 of the STSA NAL unit type to indicate step-wise temporal sublayer access, while the same picture 12a in another picture segment 131 (e.g. tile) uses a NAL unit 302 of the RASL NAL unit type.

Since STSA NAL unit types cannot be placed in the lowest temporal level 0, STSA NAL units will never be mixed with IRAP NAL units. However, they could be mixed with RADL or RASL NAL unit types just like the TRAIL NAL units mentioned above.

In one embodiment, a flag is included in a parameter set, e.g. in the PPS indicating that STSA NAL units are mixed with RASL or RADL NAL unit types.

Accordingly, in one embodiment of the invention, there is an indication in the bitstream 11, e.g. as a flag in a parameter set (PPS, SPS, VPS), that NAL unit types within a coded picture can be mixed as follows:

STSA +RADL
STSA +RASL
STSA +TRAIL

In a further embodiment, whether such a mix is allowed could be indicated for instance, with a constraint flag on sequence level or picture level.

Thus, according to an embodiment, the decoder 100 may be configured to derive an indication from the bitstream 11, wherein said indication explicitly signals towards the decoder 100 that the NAL unit 304 of the non-IRAP NAL unit type of the second sub-bitstream 11-2, which NAL unit 304 is of a Stepwise Temporal Sublayer Access unit type (STSA), is mixed with the NAL unit 302 of the non-IRAP NAL unit type of the first sub-bitstream 11-1, which NAL unit 302 is either one of the Random Access Skipped Leading Picture unit type (RASL) or the Random Access Decodable Leading Picture unit type (RADL).

According to an embodiment, the indication comprises a syntax element in a parameter set. According to a further embodiment, the syntax element is contained in at least one of a Picture Parameter Set or a Sequence Parameter Set.

In addition, an indication may be added to the bitstream 11 that effectively indicates that all NAL units 302, 304 of the picture 12a containing STSA NAL units 304 fulfil the constraints associated with the STSA NAL unit type even if they have another NAL unit type, e.g. RASL (see, e.g. NAL unit 302). This could be indicated by a flag in a SPS that indicates that the bitstream 11-1 of the (spatial) subset containing RASL pictures (see, e.g. NAL unit 302) fulfils the constraints that each RASL picture is also an STSA picture. Such a signalling is even more important for merging use-cases, where the original bitstream containing RASL or RADL NAL units could indicate whether the RADL and RASL NAL units fulfil the properties of STSA pictures, so that if mixed with STSA, it can be easily derived whether the mixed coded picture has STSA properties or not.

Thus, according to an embodiment, the decoder 100 may be configured to decode a constraint flag from a parameter set of the bitstream 11, the constraint flag indicating towards the decoder 100 that any access unit 30 of the bitstream 11, which comprises a mix of one or more NAL units 302 of non-IRAP Leading Picture NAL unit type (e.g. RASL or RADL) with one or more NAL units 304 of the Stepwise Temporal Sublayer Access unit type (STSA), fulfils constraints being associated with the Stepwise Temporal Sublayer Access unit type (STSA), i.e. each RASL picture 302 may be treated as an STSA picture.

Said constraints may indicate towards the decoder 100 that any pictures, which follow in decoding order and which are associated with a next-higher temporal sub-layer than a Stepwise Temporal Sublayer Access (STSA) unit type, are not allowed to reference pictures in said next-higher temporal sub-layer if said next-higher temporal sub-layer precedes said Stepwise Temporal Sublayer Access unit type (STSA).

Alternatively, the bitstream 11 with a coded picture 12a having mixed NAL unit types (e.g. STSA+RASL or RADL)

may include a flag that indicate that the picture 12*a* for which the flag is set may contain NAL units 304 of the STSA NAL unit types but (in total) does not obey the constraints associated with the STSA NAL unit type. This would indicate that even though a coded picture 12*a* may have a NAL unit type equal to STSA, the property implied by STSA (i.e. a further temporal level can be decoded from that AU onwards) does not apply. Thus, parsing of STSA would be ignored and step-wise temporal sublayer access would be inferred.

Thus, according to an embodiment, the decoder 100 may be configured to decode a flag from a parameter set, the flag indicating towards the decoder 100 that any access unit 30 which comprises a mix of one or more NAL units 302 of non-IRAP Leading Picture NAL unit type (RASL or RADL) with one or more NAL units 304 of the Stepwise Temporal Sub-layer Access unit type (STSA), does not obey the constraints associated with the Stepwise Temporal Sublayer Access (STSA) unit type. Furthermore, the decoder 100 may be configured to, in response to said flag, refrain from parsing the one or more NAL units 304 of the Stepwise Temporal Sublayer Access (STSA) unit type and implicitly infer a Stepwise Temporal Sublayer Access decoding, i.e. the STSA constraints do not apply to the respective Access Unit.

This concept may also be applied independent from mixing the NAL unit types, as described above. Thus, according to an embodiment, a decoder 100 for decoding video content 12 is suggested, the decoder 100 being configured to decode a bitstream 11, and to decode a constraint flag from a parameter set of the bitstream 11, wherein said constraint flag indicates towards the decoder 100 that, within the bitstream 11, any access unit 30 which comprises NAL units 302 of non-IRAP Leading Picture NAL unit type (e.g. RASL or RADL) fulfils constraints being associated with the Stepwise Temporal Sublayer Access (STSA) unit type.

1.3. Mixing Various RAP Types

A further important case that is not enabled by the prior art is allowing mixing pictures of an open GOP (Group of Pictures) structure with pictures of a closed GOP structure. For instance, mixing of two different types of IRAP NAL unit types (e.g. IDR, CRA), e.g. IDR_W_RADL and CRA NAL unit types may be allowed, or mixing of NAL units of the same NAL unit type, e.g. CRA and CRA, may be allowed:

IDR_W_RADL+CRA
CRA+CRA

As mentioned above, this embodiment shall enable to mix IRAP NAL units of a NAL unit type being associated with an open GOP structure with IRAP NAL units of a NAL unit type being associated with a closed GOP structure. For example, a CRA with RADL may be associated with a closed GOP structure, while a CRA with RASL may be associated with an open GOP structure.

Thus, according to an embodiment, a decoder 100 for decoding video content 12 may be provided, the decoder 100 being configured to decode a bitstream 11 comprising a first sub-bitstream 11-1 relating to a first spatial segment $13_1$ of pictures 12*a*, 12*b*, 12*c* of the video content 12 and a second sub-bitstream 11-2 relating to a second spatial segment 132 of the pictures 12*a*, 12*b*, 12*c* of the video content 12. According to this example, the bitstream 11 comprises at least one access unit 30 within which at least one first NAL unit 302 of the first sub-bitstream 11-1 is of an IRAP NAL unit type that is mixed with at least one second NAL unit 304 of the second sub-bitstream 11-2 which is of a further (same or different) IRAP NAL unit type.

There is at least one use-case in which this is very helpful. For instance, one approach to 360° video transmission with tiled streaming is the case where the whole low-resolution video content is transmitted (irrespective of whether portions thereof are also transmitted as high-resolution tiles). In such a case, a change in the viewing orientation and a corresponding change of the high-resolution tile selection from one viewport to another viewport is illustrated in FIG. 5.

Since the entire low-resolution video content is always available in client-side, and no tile-wise stream switching is required for this region, the low-resolution content could be encoded with CRAs and thus make use of a higher coding efficiency compared to a closed GOP structure using IDRs. Also, a longer random access point period then necessary for stream switching would suffice for this area, again benefitting the coding efficiency of the low-resolution video. On the other hand, the high-resolution tiles, might frequently change in fast progression from one viewport to another and so on as shown in FIG. 5 and therefore, using CRAs and associated RASL pictures as for the low-resolution video would not allow a smooth switch of the viewport. This is because of the RASL areas within picture that change position or represent newly added tile streams are not able to be decoded appropriately (due to missing references) and are hence discarded when a viewport change is encountered.

Figure 7:
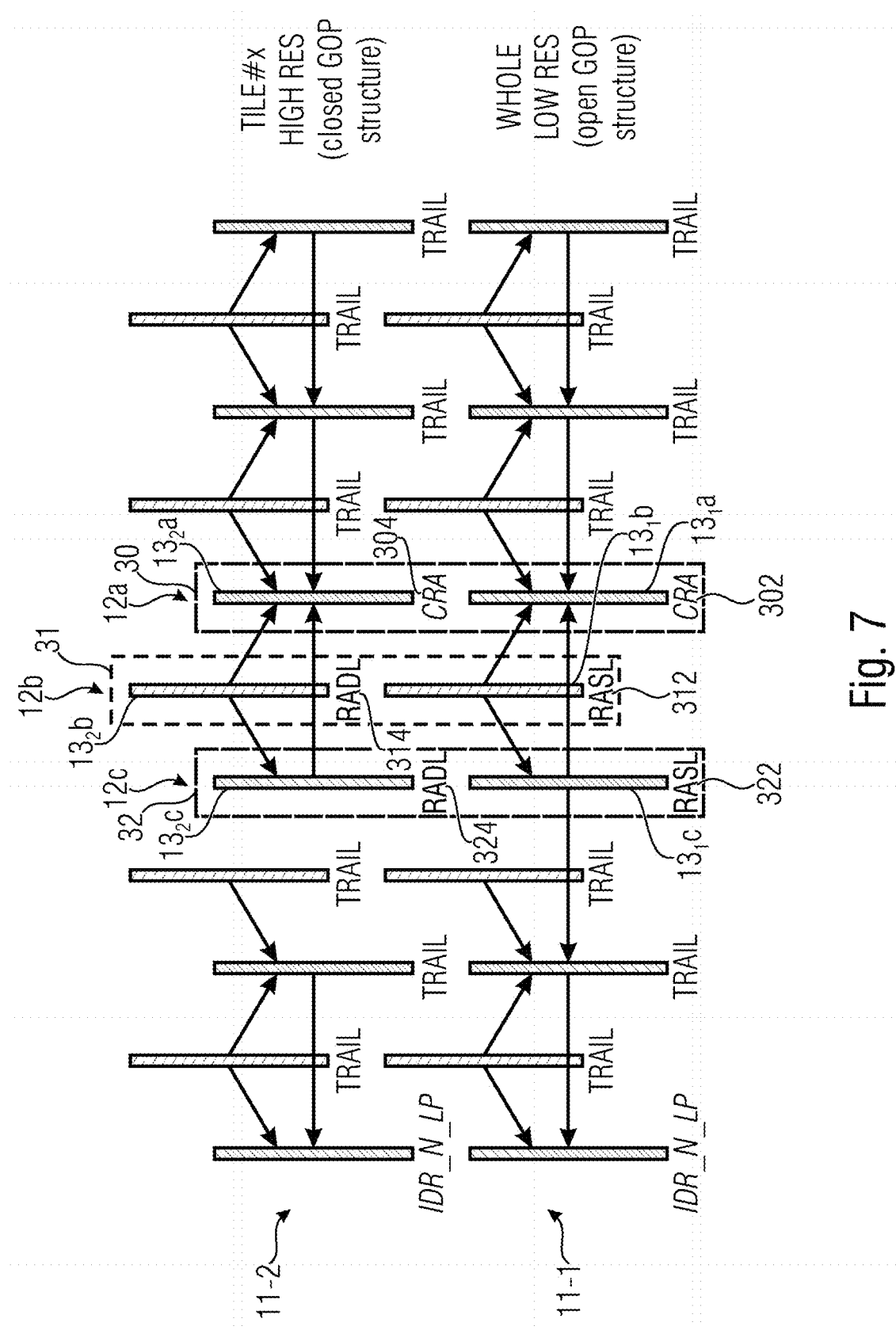

FIG. 7 shows an example where NAL units 304 being associated with a closed GOP structure are mixed with NAL units 302 being associated with an open GOP structure. In this particular but non-limiting example, a NAL unit 304 of the type CRA with a leading RADL 314 (closed GOP) is mixed with a NAL unit of the type CRA 302 with a leading RASL 312 (open GOP). This non-limiting example shows a coding structure for a high-resolution area in the second sub-bitstream 11-2 using a closed GOP structure with CRA in combination with a leading picture of the RADL type and a low-resolution area in the first sub-bitstream 11-1 using an open GOP structure with CRA in combination with a leading picture of the RASL type.

According to an embodiment, the decoder 100 is configured to process the bitstream 11, wherein the IRAP NAL unit type of the NAL unit 304 of the second sub-bitstream 11-2 is of an IRAP NAL unit type being associated with a closed GOP structure, and the IRAP NAL unit type of the NAL unit 302 of the first sub-bitstream 11-1 is of an IRAP NAL unit type being associated with an open GOP structure.

In this particular but non-limiting embodiment as shown in FIG. 7, the IRAP NAL unit type of the NAL unit 304 of the second sub-bitstream 11-2 is a CRA unit type with a Random Access Decodable Leading Picture unit type (CRA with RADL), and the IRAP NAL unit type of the NAL unit 302 of the first sub-bitstream 11-1 is a CRA unit type with a Random Access Skipped Leading Picture unit type (CRA with RASL).

It is to be noted that FIG. 7 shows the sequence of access units and the therein contained pictures in their display order. The display order may, however, differ from the coding order, which may also be referred to as the bitstream order. As can be seen, access unit 30 comprises a mixed picture 12*a* comprising a first VCL NAL unit 302 representing a first spatial segment $13_1 a$ of the picture 12*a* in the first sub-bitstream 11-1 and a second VCL NAL unit 304 representing a second spatial segment $13_2 a$ of the picture 12*a* in the second sub-bitstream 11-2. In this case, the first and second NAL units are IRAP NAL units. In this particular but non-limiting example, both the first and second NAL units 302, 304 are of the IRAP NAL unit type CRA. Again, FIG. 7 shows the display order of the consecutive pictures.

So, in display order, a further access unit 31 may precede the above discussed access unit 30. Said preceding access unit (AU) 31 comprises a mixed picture 12b comprising a first VCL NAL unit 312 representing a first spatial segment $13_1b$ of the picture 12b in the first sub-bitstream 11-1 and a second VCL NAL unit 314 representing a second spatial segment $13_2b$ of the picture 12b in the second sub-bitstream 11-2. The first NAL unit 312 of this AU 31 is of the non-IRAP NAL unit type RASL, while the second NAL unit 314 of this AU 31 is of the non-IRAP NAL unit type RADL. Again, FIG. 7 shows the display order of the consecutive pictures.

Optionally, and still further in display order, one or more further access units, such as exemplarily depicted access unit 32, may precede the above discussed access unit 31. More generally, the access unit 31 comprising non-IRAP NAL units 312, 314 (e.g. RASL or RADL) may be preceded, in display order, by at least one further access unit 32, which may also preferably comprise non-IRAP NAL units 322, 324 (e.g. RASL or RADL). In order to maintain the open GOP structure in the first sub-bitstream 11-1, the RASL NAL unit 312 of the access unit 31 may be preceded (in display order) by a NAL unit 322 which is contained in the preceding (in display order) access unit 32 and which may also be of the RASL type. In turn, in order to maintain the closed GOP structure in the second sub-bitstream 11-2, the RADL NAL unit 314 of the access unit 31 may be preceded (in display order) by a NAL unit 324 which is contained in the preceding (in display order) access unit 32 and which may also be of the RADL type.

The coding order, also referred to as bitstream order, may deviate from the display order depicted in FIG. 7. For example, the RADL and RASL pictures $13_1b$, $13_2b$, $13_1c$, $13_2c$ are coded dependently, which means that they retrieve differential coding information from their respective following (in display order) CRA pictures $13_1a$, $13_2a$. For example, RADL and RASL pictures $13_1b$, $13_2b$ contained in the access unit 31 reference following (in display order) CRA pictures $13_1a$, $13_2a$ contained in the access unit 30 even though access unit 30 follows (in display order) access unit 31.

RASL pictures $13_1b$ may optionally further reference preceding (in display and coding order) pictures, such as the preceding RASL picture $13_1c$, which is exemplarily depicted in FIG. 7. Said further RASL picture Accordingly, said further and preceding RASL picture $13_1c$ of the preceding access unit 32 has to be coded prior to the RASL picture $13_1b$ of access unit 31. However, said further and preceding RASL picture $13_1c$ of the preceding access unit 32 may itself reference pictures which are following in display order but leading in coding order, such as the IRAP (CRA) picture$13_1a$ of access unit 30. That means, even though said IRAP (CRA) picture $13_1a$ of access unit 30 is the last picture (in display order) of the above discussed sequence (i.e. IRAP (CRA) picture $13_1a$ of access unit 30 follows in display order both RASL pictures $13_1b$, $13_1c$), said IRAP (GRA) picture $13_1a$ of access unit 30 is the first picture in coding order, i.e. it has to be coded first, since both RASL pictures $13_1b$, $13_1c$ refer to IRAP (CRA) picture $13_1a$ during coding.

The same holds true for RADL pictures. RADL pictures $13_2b$ may optionally further reference preceding (in display and coding order) pictures, such as the preceding RADL picture $13_2c$, which is exemplarily depicted in FIG. 7. Accordingly, said further and preceding RADL picture $13_2c$ of the preceding access unit 32 has to be coded prior to the RADL picture $13_2b$ of access unit 31. However, said further and preceding RADL picture $13_2c$ of the preceding access unit 32 may itself reference pictures which are following in display order but leading in coding order, such as the IRAP (CRA) picture$13_2a$ of access unit 30. That means, even though said IRAP (CRA) picture $13_2a$ of access unit 30 is the last picture (in display order) of the above discussed sequence (i.e. IRAP (CRA) picture$13_2a$ of access unit 30 follows in display order both RADL pictures $13_2b$, $13_2c$), said IRAP (CRA) picture$13_2a$ of access unit 30 is the first picture in coding order, i.e. it has to be coded first, since both RADL pictures $13_2b$, $13_2c$ refer to IRAP (CRA) picture $13_2a$ during coding.

Stated in more general terms, non-IRAP pictures of the Leading Picture (LP) type (e.g. RASL and RADL pictures $13_1b$, $13_1c$, $13_2b$, $13_2c$) may reference following (in display order) IRAP pictures (e.g. CRA pictures $13_1a$, $13_2a$), wherein the IRAP pictures (e.g. CRA pictures $13_1a$, $13_2a$) have to be coded first, i.e. prior to their leading (in display order) non-IRAP pictures of the Leading Picture (LP) type (e.g. RASL and RADL pictures $13_1b$, $13_1c$, $13_2b$, $13_2c$). That means, even though the IRAP pictures (e.g. CRA pictures $13_1a$, $13_2a$) follow the non-IRAP pictures of the Leading Picture (LP) type (e.g. RASL and RADL pictures $13_1b$, $13_1c$, $13_2b$, $13_2c$) in display order, the IRAP pictures (e.g. CRA pictures $13_1a$, $12_2a$) are firstly coded. In other words, the non-IRAP pictures of the Leading Picture (LP) type (e.g. RASL and RADL pictures $13_1b$, $13_1c$, $13_2b$, $13_2c$) are leading the IRAP pictures (e.g. CRA pictures $13_1a$, $13_2a$) in display order, while the IRAP pictures (e.g. CRA pictures $13_1a$, $12_2a$) are leading the non-IRAP pictures of the Leading Picture (LP) type (e.g. RASL and RADL pictures $13_1b$, $13_1c$, $13_2b$, $13_2c$) in bitstream order (coding order). In yet other words, the non-IRAP pictures of the Leading Picture (LP) type (e.g. RASL and RADL pictures $13_1b$, $13_1c$, $13_2b$, $13_2c$) lead the IRAP pictures (e.g. CRA pictures $13_1a$, $13_2a$) in display order, but the non-IRAP pictures of the Leading Picture (LP) type (e.g. RASL and RADL pictures $13_1b$, $13_1c$, $13_2b$, $13_2c$) follow the IRAP pictures (e.g. CRA pictures $13_1a$, $13_2a$) in coding/bitstream order.

Given the above case and coding structures, it is one of the advantages of the present invention that the mix of CRA with leading RASL (open GOP) and CRA with leading RADL (closed GOP) within a picture of an Access Unit 30 is allowed. When such a mixed-NALU access unit 30 is encountered within the Coded Video Sequence (CVS) during regular playout (decoding the whole bitstream 11 from the beginning), all reference pictures required are available. Therefore, the pictures following the mixed picture with RASL NAL units would be decoded and output normally.

However, when such a mixed NALU is encountered during a seeking operation or the decoding process starts from such an AU during random accessing, the process for generating unavailable reference pictures need to be invoked and either:

the subsequent processing chain needs to be informed that the RASL areas are not correctly decoded and the corresponding low-resolution area is to be used, e.g. through an SEI indication.

the affected pictures can be dropped from the output entirely.

This means that when starting decoding the mixed picture one option would be to treat it as a GDR picture where some parts are decodable and ok to be shown and others are not ok to be shown and will be refreshed over time (until all RASL NAL units are over). Such an operation is, for instance, relevant in the 360 scenario when the RAP types are selected contrary to how it is shown in FIG. 7, i.e. low-resolution uses a closed GOP structure (e.g. CRA with RADL) and high resolution content uses an open GOP structure (e.g. CRA with RASL). Then the low resolution could be shown since it uses the closed GOP configuration and the player would wait until the high resolution using the open GOP structure is cleanly decoded to show it.

The other option to handle such a situation would be to not show any of the pictures being affected by missing references (not even partially) and drop them, i.e. drop any mix picture having a NAL unit type equal to RASL.

In other words, any mix picture 12b, 12c having a NAL unit type 312, 322 equal to RASL can be marked as to be dropped/discarded in order to ensure a continuous decoding behaviour.

Thus, according to an embodiment, the decoder 100 may be configured to decode and present a co-located spatial segment $13_2b$, $13_2c$, . . . of one or more pictures 12b, 12c, . . . of access units 31, 32, . . . which follow, in bitstream order, the at least one access unit 30 to which the NAL unit 304 of the second sub-bitstream 11-2 relates (e.g. CRA with RADL), which co-located spatial segments $13_2b$, $13_2c$, . . . are collocated to the second spatial segment $13_2a$ of the picture 12a of the at least one access unit 30 to which the NAL unit 304 of the second sub-bitstream 11-2 relates. Furthermore, the decoder 100 may be configured to mark as to be discarded a co-located spatial segment $13_1b$, $13_1c$, . . . of one or more pictures 12b, 12c, . . . of the access units 31, 32, which follow, in bitstream order, the at least one access unit 30 to which the NAL unit 302 of the first sub-bitstream 11-1 relates (e.g. CRA with RASL), which co-located segments $13_1b$, $13_1c$, . . . are collocated to the first spatial segment $13_1a$ of the picture 12a of the at least one access unit 30 to which the NAL unit 302 of the first sub-bitstream 11-1 relates.

According to a further embodiment, the decoder 100 may be configured to act, depending on whether the bitstream 11 is to be decoded in case of continuous decoding during regular playout (decoding the whole bitstream 11 from the beginning) or in case of a decoding start (e.g. during a seeking operation or the decoding process starts from such an AU during random accessing).

In case of regular playout (decoding the whole bitstream 11 from the beginning), the decoder 100 may be configured to decode and present a co-located spatial segment $13_2b$, $13_2c$, . . . of one or more pictures 12b, 12c, . . . of access units 31, 32, . . . which follow, in bitstream order, the at least one access unit 30 to which the NAL unit 304 of the second sub-bitstream 11-2 relates (e.g. CRA with RADL), which co-located spatial segments $13_2b$, $13_2c$, . . . are collocated to the second spatial segment $13_2a$ of the picture 12a of the at least one access unit 30 to which the NAL unit 304 of the second sub-bitstream 11-2 relates. Furthermore, in case of a decoding start (e.g. during a seeking operation or the decoding process starts from such an AU during random accessing), the decoder 100 may be configured to discard the one or more pictures 12b, 12c, . . . of access units 31, 32, . . . which follow, in bitstream order, the at least one access unit 30 and resume picture output after the one or more discarded pictures 12b, 12c, . . . . In other words, any mix picture 12b, 12c having at least one NAL unit 312, 322 being equal to RASL is dropped/discarded.

According to a further embodiment, the decoder 100 may be configured to mark said broken spatial segments $13_1b$, $13_1c$, . . . towards a subsequent processing chain by means of an SEI (Supplemental Enhancement Information) message.

In a further embodiment there is an indication in the bitstream that the AU is treated as a CRA, i.e. IRAP with NoIncorrectPicOutputFlag equal to 1 irrespective of whether there are IDR_W_RADL NAL unit types. There is an indication that the AU is mixed-NALU but an IRAP and the mentioned characteristic of Open GOP structures. In other words, the decoder 100 may be configured to derive an indication from the bitstream 11 indicating towards the decoder 100 to decode the at least one access unit 30 related with the first sub-bitstream 11-1 and the second sub-bitstream 11-2 in a manner corresponding to a Clean Random Access NAL unit type.

In the above description, embodiments were discussed in which the decoder 100 is configured to process bitstreams 11 in which A) NAL units of the non-IRAP NAL unit type (e.g. RASL, RADL, TRAIL, STSA) are mixed with at least one different second NAL unit of a different non-IRAP NAL unit type (e.g. RASL, RADL, TRAIL, STSA), or B) NAL units of an IRAP NAL unit type (e.g. IDR_W_RADL, CRA) are mixed with at least one NAL unit of a further IRAP NAL unit type (e.g. IDR_W_RADL, CRA).

However, there may be a further embodiment according to which the decoder 100 may be configured to process bitstreams 11 in which C) NAL units of an IRAP NAL unit type (IDR_W_RADL, CRA) are mixed with at least one NAL unit of either one of a non-IRAP Leading Picture NAL unit type (e.g. RASL, RADL) or an STSA NAL unit type.

Further embodiments also suggest to provide a corresponding apparatus for processing the video bitstream 11 during encoding of the bitstream 11 and/or merging of the first and second sub-bitstreams 11-1, 11-2. Said apparatus 10 may be at least one of an encoder, a merger or a network node for processing the bitstream 11 according to the herein described innovative principle.

Thus, according to an embodiment, an apparatus 10 for processing video content 12 is suggested, the apparatus 10 being configured to provide a first sub-bitstream 11-1 relating to a first spatial segment $13_1$ of pictures 12a, 12b, 12c of the video content 12 and provide a second sub-bitstream 11-2 relating to a second spatial segment 132 of the pictures 12a, 12b, 12c of the video content 12, wherein the first sub-bitstream 11-1 and the second sub-bitstream 11-2 are part of a bitstream 11, wherein A) the bitstream (11) comprises at least one access unit (30) within which at least one first NAL unit (302) of the first sub-bitstream (11-1) is of a non-IRAP NAL unit type that is mixed with at least one different second NAL unit (304) of the second sub-bitstream (11-2) which is of a different non-IRAP NAL unit type, or B) the bitstream (11) comprises at least one access unit (30) within which at least one first NAL unit (302) of the first sub-bitstream (11-1) is of an IRAP NAL unit type that is mixed with at least one second NAL unit (304) of the second sub-bitstream (11-2) which is of a further IRAP NAL unit type, or C) the bitstream 11 comprises at least one access unit 30 within which at least one first NAL unit 302 of the first sub-bitstream 11-1 is of an IRAP NAL unit type that is mixed with at least one second NAL unit 304 of the second sub-bitstream 11-2 which is of either one of a non-IRAP Leading Picture NAL unit type (e.g. RASL, RADL) or an STSA NAL unit type.

1.4. Summary and Example Syntax

In the following a summary of the mix types allowed within this invention is shown:

| NAL unit type | to be mixed with |
|---|---|
| CRA_NUT | IDR_W_RADL |
| TRAIL | RADL or RASL or STSA |
| STSA | RADL or RASL |
| RASL | TRAIL or RADL |
| RADL | TRAIL or RASL |

In the new mix types described in this invention there are two types of mixes, one that entails IRAP types and other that does not have IRAP types.

Option 1

As discussed in the text above in previous sections, one option is to signal with a flag in the PPS only mixes that entail IRAP types. For instance, re-use the existing one that mixes IDR or CRAs with TRAIL up to VCL_RSV_6 (mixed_nalu_types_in_pic_flag). The non IRAP types could be signalled with a constraint flag at SPSNPS/DPS.

mixed_nalu_types_in_pic_flag equal to 1 specifies that each picture referring to the PPS has more than one VOL NAL unit and that the VAL NAL units do not have the same value of nal_unit_type, there is at least one VCL NAL unit with the value of nal_unit_type in the range of IDR_W_RADL to CRA_NUT and that the picture is not an IRAP IDR picture. mixed_nalu_types_in_pic_flag equal to 0 specifies that each picture referring to the PPS has one or more VCL NAL units and the VCL NAL units of each picture refering to the PPS have the same value of nal_unit_type when VCL NAL units have the value of nal_unit_type in the range of IDR_W_RADL to CRA_NUT.

Then if an AU is the first AU of the bitstream or the first AU following an end of Sequence (EOS) NAL unit that refers to a PPS with mixed_nalu_types_in_pic_flag equal to 1, the NAL unit types in the coded picture have to be CRA_NUT and IDR_W_RADL. Mixed pictures with IDR/CRA with non-IRAP types are only allowed for AUs not being the first one in a bitstream or sequence.

no_non jrap_mixed_nalu_types jn_pic_constraintilag equal to 1 specifies that it is a requirement of bitstream conformance that the VCL NAL units of pictures having TRAIL, STSA, RASL and RADL in the sequence have the same value of nal_unit_type. A value equal to 0 does not impose such a constraint, i.e. a picture might have two different values of nal_unit_type among TRAIL, STSA, RASL and RADL.

Option 2

Another option would be to have instead of a flag (mixed_nalu_types_in_pic_flag) in the PPS an indication (idc) that indicates different combinations.

no_mixed_nalu_types_in_pic_constraint_flag equal to 1 specifies that it is a requirement of bitstream conformance that mixed_nalu_types_in_pic_idc shall be equal to 0. no_mixed_nalu_types_in_pic_constraint_flag equal to 0 does not impose such a constraint.

mixed_nalu_types_in_pic_idc equal to 0 specifies that each picture referring to the PPS has one or more VCL NAL units and the VCL NAL units of each picture refering to the PPS have the same value of nal_unit_type.

mixed_nalu_types_in_pic_idc equal to 1 specifies that each picture referring to the PPS has more than one VCL NAL unit and that the VCL NAL units shall all have two particular values of nal_unit_type in the range of TRAIL_NUT to RSV_VCL_6, inclusive.

| NAL unit type | to be mixed with |
|---|---|
| TRAIL | RADL or RASL or STSA |
| STSA | RADL or RASL |
| RASL | TRAIL or RADL |
| RADL | TRAIL or RASL | mixed_nalu_types_in_pic_idc equal to 2 specifies that each picture referring to the PPS has more than one VCL NAL unit and one or more of the VCL NAL units shall all have a particular value of nal_unit_type in the range of IDR_W_RADL to CRA_NUT, inclusive, and the other VCL NAL units shall all have a particular value of nal_unit_type in the range of TRAIL_NUT to RSV_VCL_6, inclusive, or equal to GRA_NUT.

This value corresponds to the allowed mix of NAL units with existing flag.

| NAL unit type | to be mixed with |
|---|---|
| CRA_NUT, IDR_W_RADL, IDR_N_LP | TRAIL, STSA, RADL, RASL, . . . VCL_RSV_6, GRA_NUT | mixed_nalu_types_in_pic_idc equal to 3 specifies that each picture referring to the PPS has more than one VCL NAL unit with the value of nal_unit_type IDR_W_RADL and one or more VCL NAL unit with the value of nal_unit_type CRA_NUT.

| NAL unit type | to be mixed with |
|---|---|
| CRA_NUT | IDR_W_RADL |

For VCL NAL units of any particular picture, the following applies:
- If mixed_nalu_types_in_pic_idc is equal to 0, the value of nal_unit_type shall be the same for all coded slice NAL units of a picture. A picture or a PU is referred to as having the same NAL unit type as the coded slice NAL units of the picture or PU.
- If mixed_nalu_types_in_pic_idc equal to 1 or 2, the following applies.
  - If one of the VCL NAL units in the picture has value of nal_unit_type equal to TRAIL_NUT, a picture or a PU is referred to as being a trailing picture or a trailing PU.
  - Otherwise (no TRAIL_NUT VCL NAL units in the picture), a picture or PU is referred to as being a leading picture or a leading PU.
    - If one of the VCL NAL units in the picture has value of nal_unit_type equal to RADL_NUT, a picture or a PU is referred to as being a RADL picture or a RADL PU.

Otherwise (none of the VCL NAL units in the picture has value of nal_unit_type equal to DL_NUT), a picture or a PU is referred to as being a RASL picture or a RASL PU.

Otherwise (mixed_nalu_types_in_pic_idc equal to 3), a picture is referred to as being a CRA picture or a CRA PU.

The aspects related to treating leading NAL unit types as STSA pictures could be implemented with a constraint flag as follows.

| general_constraint_info( ) { | Descriptor |
|---|---|
| general_progressive_source_flag | u(1) |
| ... | |
| leading_stsa_pictures_flag | u(1) |
| ... | |
| while( !byte_aligned( ) ) | |
| gci_alignment_zero_bit | f(1) |
| } | | leading_stsa_pictures_flat equal to 1 specifies that inter prediction reference for RADL and RASL pictures are constraint as specified below. no_mixed_nalu_types_in_pic_constraint_flag equal to 0 does not impose such a constraint.

When leading_stsa_pictures_flag equal to 1, the following applies:

When the current picture is an RASL or RADL picture, there shall be no active entry in RefPicList[0] or RefPicList[1] that has TemporalId equal to that of the current picture.

When the current picture is a picture that follows, in decoding order, an RASL or RADL and precedes the associated IRAP picture that has TemporalId equal to that of the current picture, there shall be no picture that has TemporalId equal to that of the current picture included as an active entry in RefPicList[0] or RefPi-cList[1] that precedes the RASL or RADL picture in decoding order.

In other words, the restrictions associated with an STSA picture forbid that pictures following in decoding order and associated with the next higher temporal sub-layer than the STSA use any references in that next higher temporal sub-layer preceding the STSA, i.e. a decoder can start decoding of the next temporal sub-layer from an STSA onwards. Such restriction can of course be enforced also for RASL/RADL pictures as described above and, hence, the above signalling could serve as an indication of these properties.

2. ixin Picture Types within a ulti-Layer Access Unit

The present subsection may, by way of non-limiting examples, be concerned with Multi-Layer Access Units in a Multi-Layer bitstream. However, the features described herein may already be applied to one single layer. Furthermore, the present subsection describes the inventive principle by referring to Long-Term Reference Pictures, as a non-limiting example. However, the present inventive concept is applicable to Short Term Reference Pictures as well, i.e. the features described herein may be applied to picture referencing in general. Yet further, the present subsection may describe, as a non-limiting example, a POC MSB reset by setting the POC value to zero, i.e. MSB=0. However, the value zero only acts as a placeholder to symbolize a decreasing value of MSB, e.g. it is also possible that an MSB reset could happen to any predetermined value unequal to 0 but smaller than the current MSB at the respective bitstream position.

Prior art may provide support for mixing pictures of different RAP types within a layered access unit by signalling the most significant POC (Picture Order Count) bits (poc_msb_val), i.e. for time instances where an access unit does contain RAP and non-RAP pictures in its layers simultaneously. However, an issue may remain with reference pictures that are of the Leading Picture NAL unit type with references to pictures preceding their associated IRAP picture in coding order as shown in the following by example of Long Term Reference Pictures but also applicable to Short Term Reference Pictures and for which the present invention provides a solution.

The current POC signalling related syntax is as follows.

| SPS Syntax | |
|---|---|
| seq_parameter_set_rbsp( ) { | Descriptor |
| ... | |
| log2_max_pic_order_cnt_lsb_minus4 | ue(v) |
| poc_msb_in_rap_pics_flag | u(1) |
| if( poc_msb_in_rap_pics_flag > 0 ) | |
| poc_msb_len_minus1 | ue(v) |
| ... | |
| } | |

| Slice Header Syntax | |
|---|---|
| slice_header( ) { | Descriptor |
| ... | |
| slice_pic_order_cnt_lsb | u(v) |
| if( poc_msb_in_rap_pics flag && nal_unit_type >= IDR_W_RADL && nal_unit_type <= GDR_NUT ) | |
| poc_msb_val | u(v) |
| ... | |
| } | |

Figure 8:
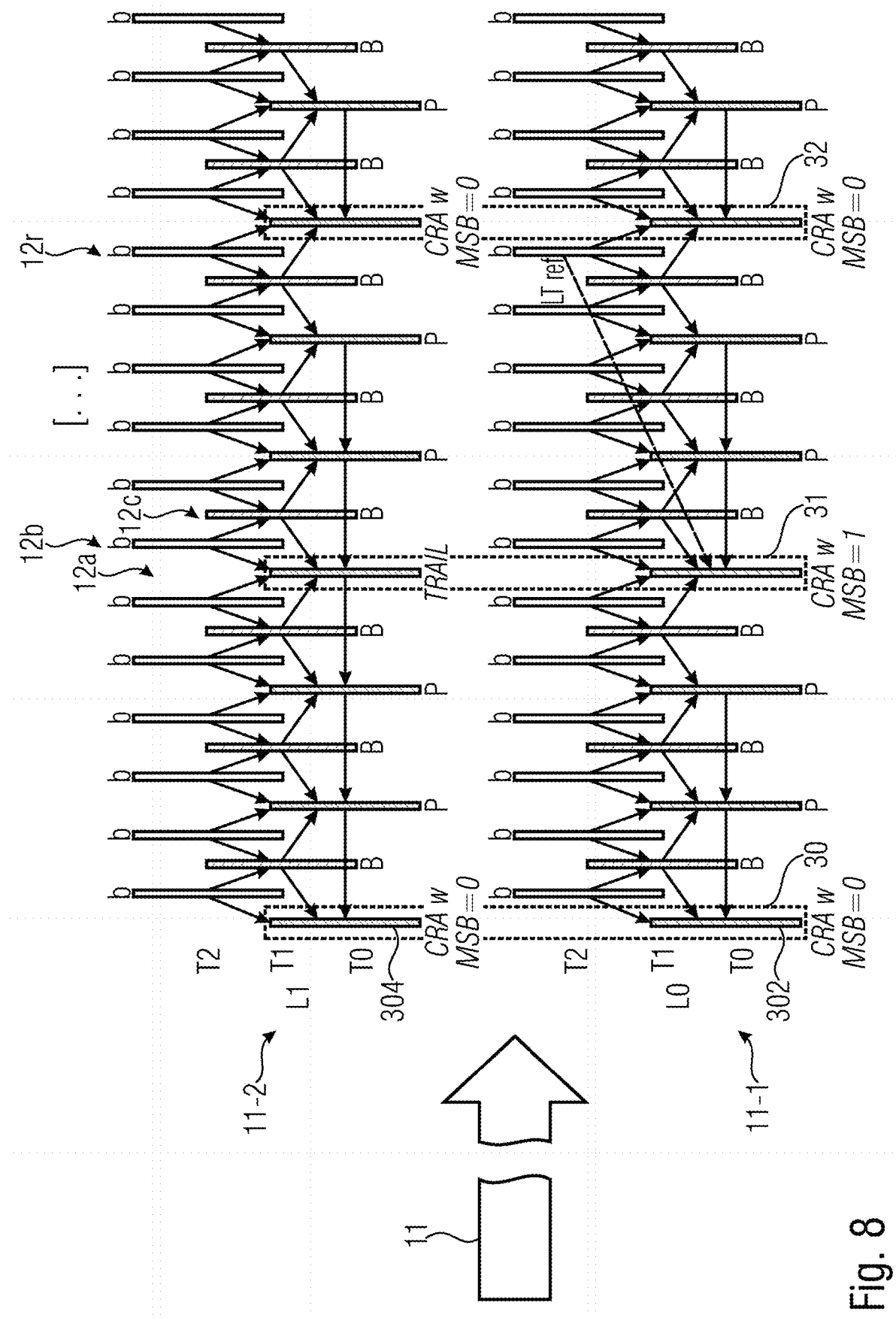

An exemplary usage of the above POC MSB signalling is to set the POC MSB to 0 when all layers have the same IRAP NAL unit type, e.g. IDR_W_RADL or CRA in all layers as illustrated in FIG. 8.

FIG. 8 shows a Multi-Layer bitstream 11 comprising a first sub-bitstream 11-1 in a first Layer L0 and a second sub-bitstream 11-2 in a second Layer L1. Each layer L1, L0 may comprise one or more temporal sub-layers T0, T1, T2. Accordingly, spatial segments of pictures may be distributed over said different layers L0, L1 and temporal sub-layers T0, T1, T2.

FIG. 8 further shows some exemplary Multi-Layer Access Units 30, 31, 32. In this example, the Multi-Layer Access Units 30, 31, 32 may comprise a first NAL unit 302 of the first sub-bitstream 11-1 in the first Layer L0 which is mixed with a second NAL unit 304 of the second sub-bitstream 11-2 in the second Layer L1. The NAL units may comprise different NAL unit types, as described above, in particular IRAP and non-IRAP NAL unit types. In addition, the NAL units may comprise slice headers in which the Picture Order Count (POC) is signalled, as mentioned above. The herein described concept is concerned with the most significant POC portion, e.g. with the Most Significant POC Bits, or POC MSB. Thus, in the Figures, the POC MSB is depicted at each IRAP NAL unit.

For example, the Multi-Layer Access Units 30, 32 represent aligned Access Units in which the POC MSB of the first NAL unit 302 in the first sub-bitstream 11-1 is aligned with the POC MSB of the second NAL unit 304 of the second sub-bitstream 11-2, wherein both NAL units are of an IRAP NAL unit type.

The Multi-Layer Access Unit 31 represents a non-aligned Access Unit, i.e. an Access Unit in which the POC MSB of the first NAL unit 302 in the first sub-bitstream 11-1 is not aligned with a POC MSB of the second NAL unit 304 of the second sub-bitstream 11-2 (e.g. MSB=0), which is of a non-IRAP NAL unit type. Thus, the POC MSB of the first NAL unit 302 of the first sub-bitstream 11-1 may be increased by a predetermined value, e.g. increased by one.

FIG. 8 shows how the MSB signalling in the slice header described before may be used in such Multi-Layer cases. The purpose of the signalling is to keep the POC value correct at non-aligned RAPs, e.g. the non-aligned Access Unit 31 with CRA w MSB=1, i.e. avoid the resetting of POC (LSB and MSB) to zero when not all layers have an IRAP at the same access unit.

However, FIG. 8 also shows that there is an issue with (e.g. Long Term and/or Short Term) Reference Pictures 12r when the POC is aligned. For ease of understanding, the following figures may only refer to Long Term Reference Pictures. However, the present concept is also applicable to Short Term Reference Pictures.

Note that the pictures 12a, 12b, 12c, . . . previous to the last CRA access unit 32, i.e. the second aligned RAP, have a POC MSB>0 and POC LSB>0. Therefore, when resetting the MSB at the last CRA access unit 32 to 0 (as it is exemplarily shown in FIG. 8), then it would not be possible to refer to any of the previous pictures 12a, 12b, 12c, . . . using the POC MSB or a delta thereof (as is used for long term reference pictures). One such example is indicated in FIG. 8 by a green arrow marked with 'LT ref'. Thus, the example shown in FIG. 8 shall show that picture referencing may not be possible in this case.

Therefore, the present invention provides a solution for this problem such that picture referencing will become possible.

In one embodiment, a constraint is expressed in the specification or indicated through a bitstream flag (SPS, VPS, DPS) that only when all pictures within an access unit are of type IDR, i.e. IDR_W_RADL or IDR_N_LP, MSB can be set to 0. Thereby, when CRAs are used, no POC reset occurs and LT references are allowed (see FIGS. 9 and 10 for examples).

Figure 9:
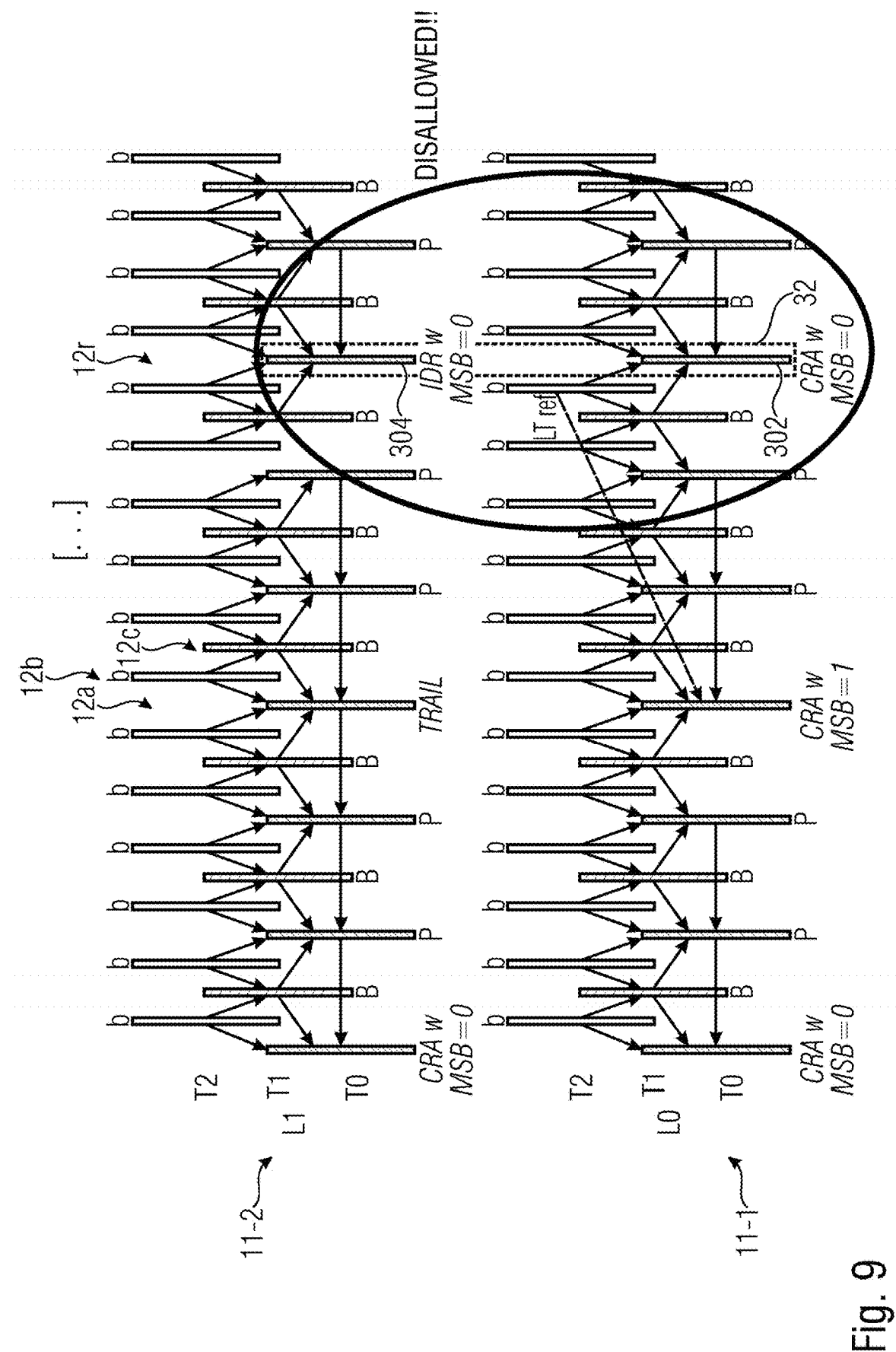

As can be seen in FIG. 9, access unit 32 may be an aligned access unit 32 in which both NAL units 302, 304 are of an IRAP NAL unit type. However, since the first NAL unit 302 of the first sub-bitstream 11-1 is of the CRA type, no POC reset shall occur. That means, FIG. 9 shows a scenario in which a POC reset is disallowed.

Figure 10:
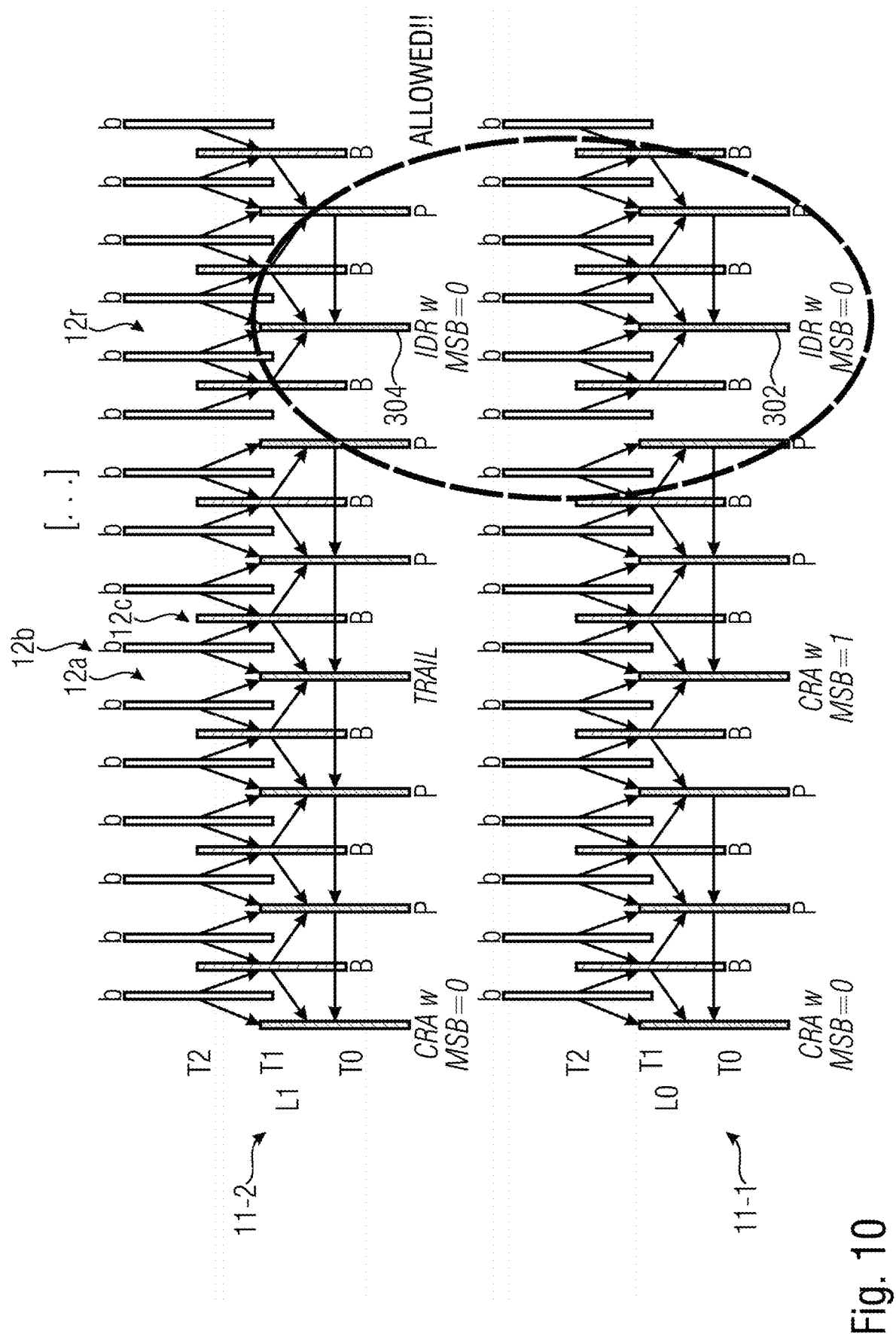

FIG. 10, instead, shows a scenario in which a POC reset is allowed since the first NAL unit 302 of the first sub-bitstream 11-1 and the second NAL unit 304 of the second sub-bitstream 11-2 are both of the IDR unit type.

Thus, according to an embodiment, a decoder 100 for decoding video content 12 is provided, the decoder 100 being configured to decode a bitstream 11 comprising a first sub-bitstream 11-1 and a second sub-bitstream 11-2, wherein the decoder 100 is configured to derive from a slice header of a NAL unit 302, 304 of the first and second sub-bitstreams 11-1, 11-2, wherein said NAL unit 302, 304 is of an IRAP NAL unit type (e.g. CRA, IDR_W_LP, IDR_N_LP), an information for setting a most significant POC portion (POC MSB) of the POC of a picture 12r which the NAL unit 302, 304 refers to. According to this example, the most significant POC portion (POC MSB) is required to be set to a predetermined value for all NAL units 302, 304 of the IRAP NAL unit type within an access unit 32 of the bitstream 11, if at least one NAL unit 302, 304 within said access unit 32 is of a non-Instantaneous Decoding Refresh unit type, e.g. of the CRA unit type.

As mentioned above, the present subsection may describe, as a non-limiting example, a POC MSB reset by setting the POC value to zero, i.e. MSB=0. However, the value zero only acts as a placeholder to symbolize a decreasing value of MSB, e.g. it is also possible that an MSB reset could happen to any predetermined value unequal to 0 but smaller than the current MSB at the respective bitstream position. Accordingly, the above mentioned predetermined value may be equal to or greater than a most significant POC portion of a POC associated with a picture 12a, 12b, . . . preceding the picture 12r which the NAL unit 302 refers to. In other words, no POC reset is allowed to occur if not all NAL units 302, 304 inside an access unit 32 are of the IDR unit type.

In some examples, said predetermined value may be equal to zero, i.e. MSB=0. In some other examples, said predetermined value may be equal to an implicitly derived most significant POC portion, e.g. to the regular SOTA POC MSB implicit derivation.

In another embodiment, there may be a constraint expressed in the specification or indicated through a bitstream flag (SPS, VPS, DPS) that whenever an aligned RAP access unit 32 occurs and POC MSB of the access unit 32 is set to 0, no (Long Term or Short Term) reference pictures 12a, 12b, 12c, . . . previous to the aligned RAP access unit 32 are allowed to be referenced by pictures 12s following the aligned RAP access unit 32 in bitstream order.

Figure 11:
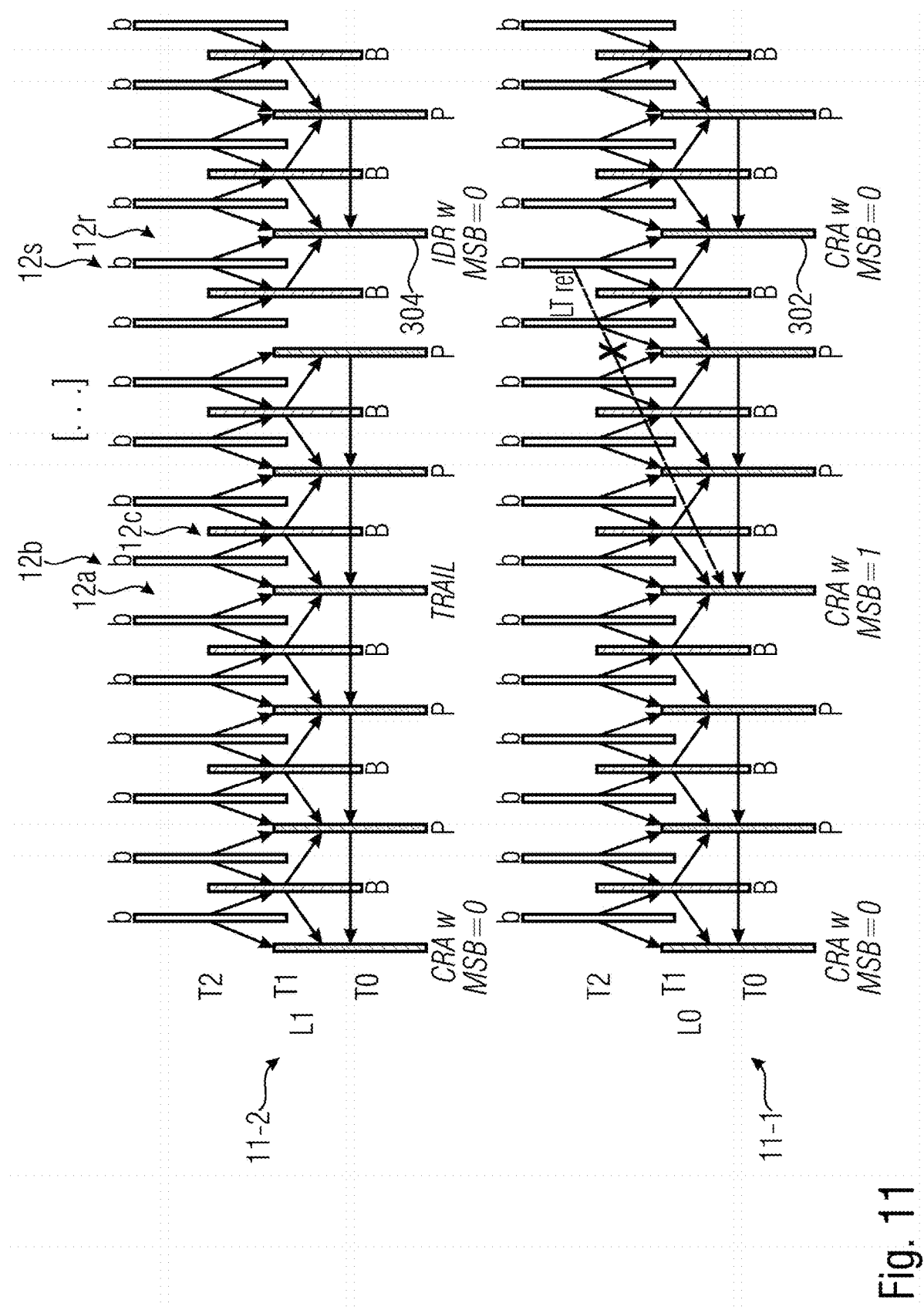

For example, FIG. 11 shows that picture 12s may follow, in decoding order, picture 12r even though picture 12s may precede picture 12r in presentation order.

Figure 12:
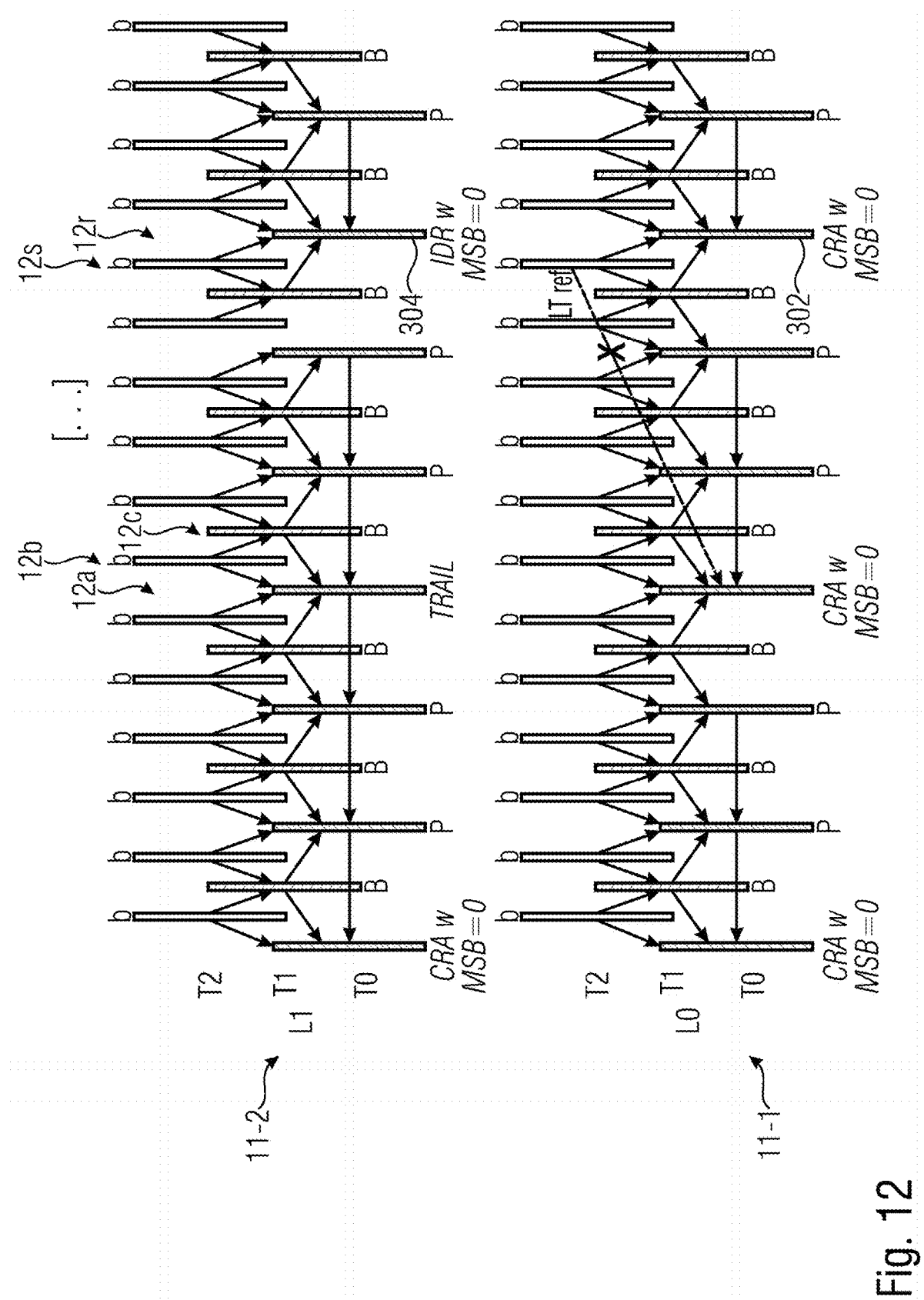
Figure 13:
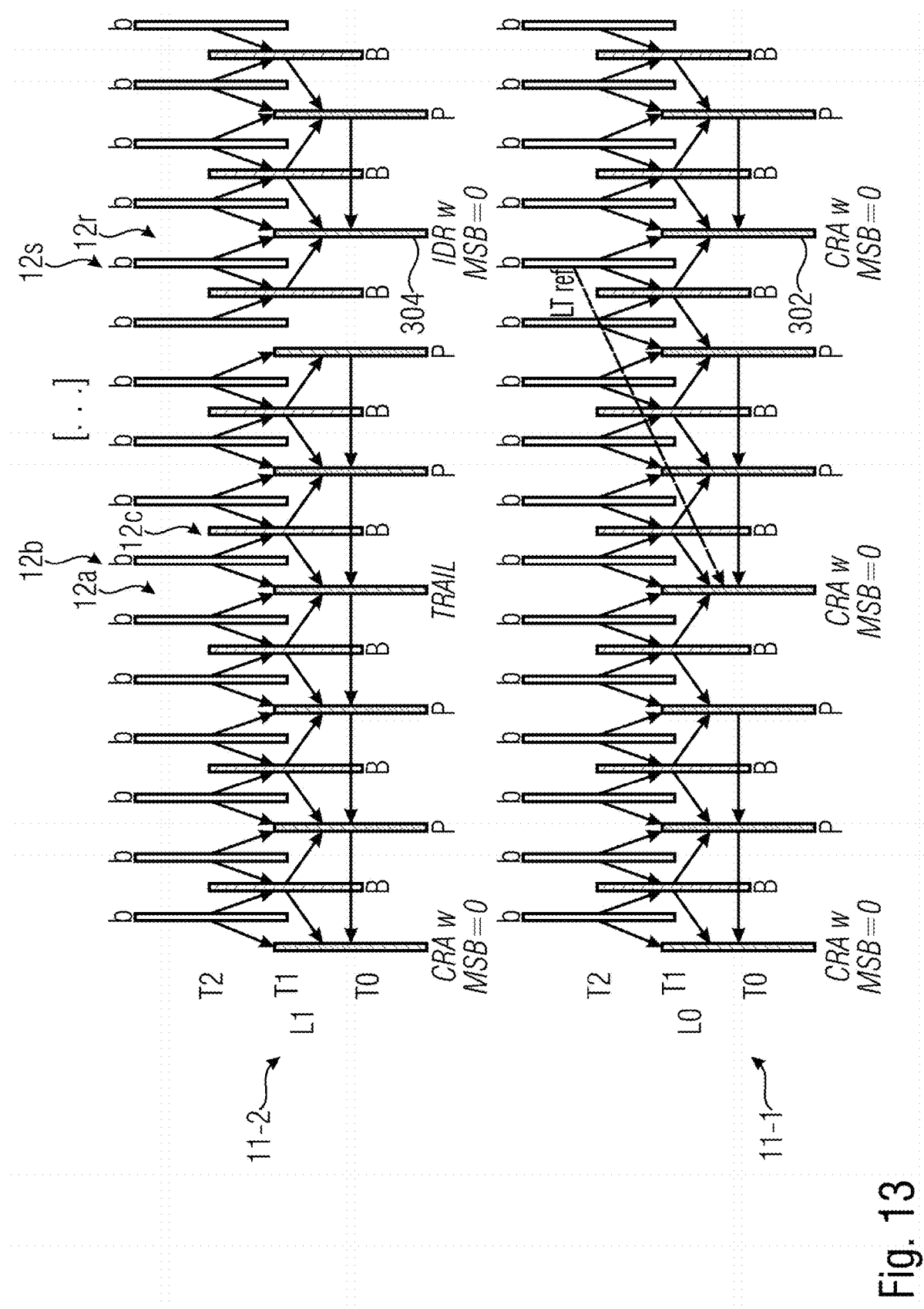

FIGS. 11 and 12 show that any pictures 12r with MSB equal to 0 do not have leading pictures 12a, 12b, 12c, . . . with LT reference pictures (while FIG. 11 represents a reset from MSB=1 to MSB=0, FIG. 12 represents MSBs being equal to 0 e.g., because POC_LSB are long enough that no increment happens). Accordingly, FIG. 11 shows a scenario in which a POC MSB reset and picture referencing is disallowed and FIG. 12 shows a scenario in which all POC MSBs may be equal to zero but picture referencing is not allowed. FIG. 13 shows that if MSB is not equal to 0, LT reference pictures are allowed for leading pictures.

Thus, according to an embodiment, a decoder 100 for decoding video content 12 is provided, the decoder 100 being configured to decode a bitstream 11 comprising a first sub-bitstream 11-1 and a second sub-bitstream 11-2, wherein the decoder 100 is configured to derive from a slice header of a NAL unit 302, 304 of the first and second sub-bitstreams 11-1, 11-2, wherein said NAL unit 302, 304 is of an IRAP NAL unit type (e.g. CRA, IDR_W_LP, IDR_N_LP), an information for setting a most significant POC portion (POC MSB) of the POC of a picture 12r which the NAL unit 302, 304 refers to. According to this example, any picture referencing is disallowed to cross, in decoding order, any access unit 32 of the bitstream 11 within which all NAL units 302, 304 are of an IRAP NAL unit type and have a slice header in which the most significant POC portion (POC MSB) is set to a predetermined value.

Again, as mentioned above, the present subsection may describe, as a non-limiting example, a POC MSB reset by setting the POC value to zero, i.e. MSB=0. However, the value zero only acts as a placeholder to symbolize a decreasing value of MSB, e.g. it is also possible that an MSB reset could happen to any predetermined value unequal to 0 but smaller than the current MSB at the respective bitstream position. Accordingly, said predetermined value of the examples described with reference to FIGS. 11 to 13 may be smaller than a most significant POC portion (POC MSB) of a POC associated with a picture (12a, 12b, 12c, . . . ) preceding the picture (12r) which the NAL unit (302, 304) refers to, i.e. a POC reset occurred.

In some examples, said predetermined value may be equal to zero, i.e. MSB=0. In some other examples, said predetermined value may be equal to an implicitly derived most sig nificant POC portion, e.g. to the regular SOTA POC MSB implicit derivation.

In another embodiment, there may be a constraint expressed in the specification or indicated through a bitstream flag (SPS, VPS, DPS) that whenever an aligned RAP access unit 32 occurs and POC MSB of the access unit 32 is set to 0 (POC reset), no (Short Term or Long Term) reference pictures 12a, 12b, 12c, . . . with MSB different to 0 previous to the aligned RAP access unit 32 are allowed to be referenced by pictures 12s following the aligned RAP access unit 32 in bitstream order.

Note that if there had not been an MSB increase in the above example shown in FIG. 8 using LT reference pictures would not be an issue as referencing of the LT reference picture is only done by POC_LSB values.

Figure 14:
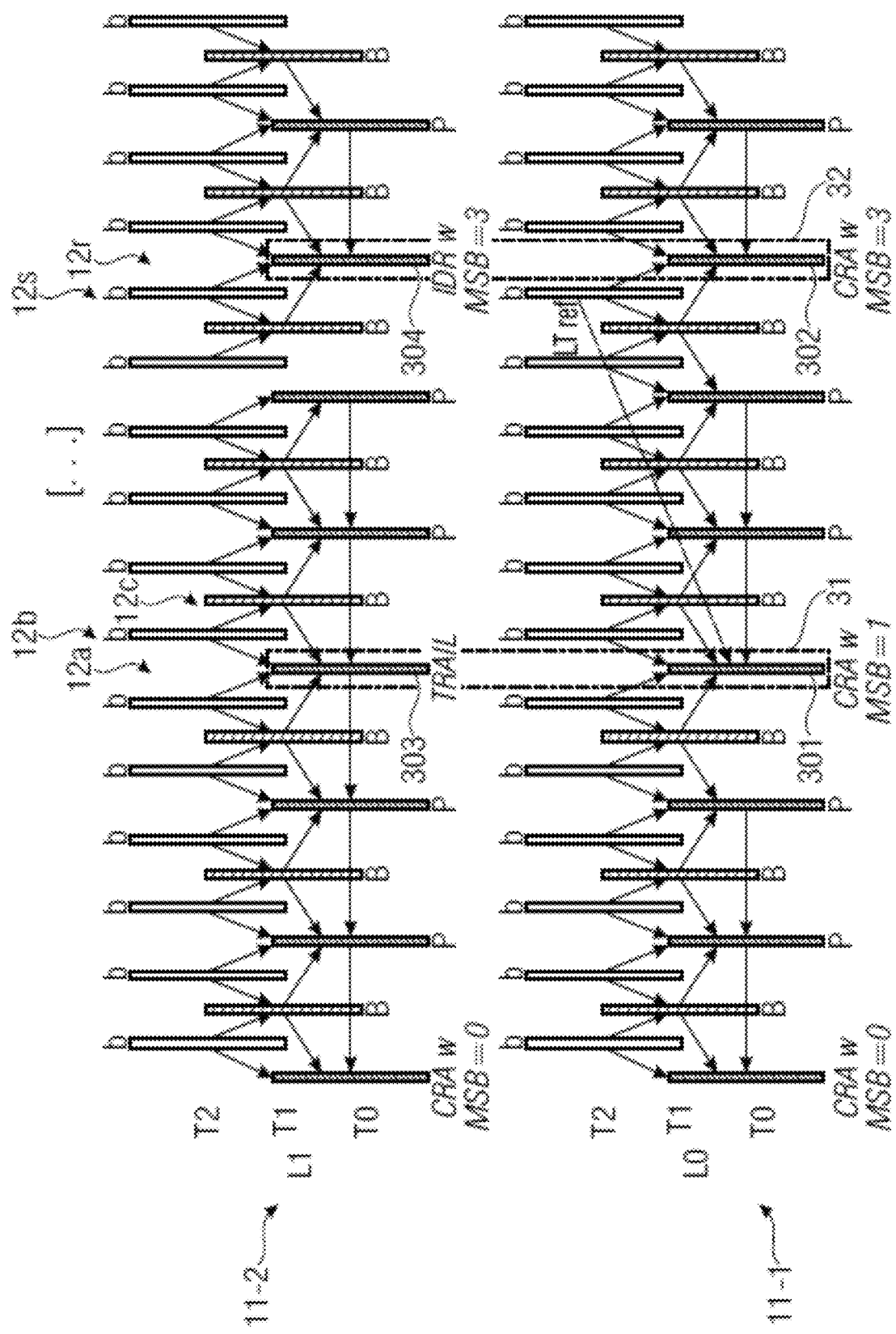

FIG. 14 shows that in the example no POC MSB reset happens. No POC MSB reset may be indicated by either increasing the POC MSB value (in the example shown in FIG. 14, the POC MSB value is increased, i.e. MSB=3) of an access unit 32 or leaving the POC MSB value of the access unit 32 at the same value as in a previous access unit 31.

Thus, according to an embodiment a decoder 100 for decoding video content 12 is provided, the decoder 100 being configured to decode a bitstream 11 comprising a first sub-bitstream 11-1 and a second sub-bitstream 11-2, wherein the decoder 100 is configured to derive from a slice header of a NAL unit 302, 304 of the first and second sub-bitstreams 11-1, 11-2, wherein said NAL unit 302, 304 is of an IRAP NAL unit type (e.g. CRA, IDR_W_LP, IDR_N_LP), an information for setting a most significant POC portion (POC MSB) of the POC of a picture 12r which the NAL unit 302, 304 refers to. According to this example, any picture referencing of reference pictures 12a, 12b, 12c, . . . of a first access unit 31 which consists of NAL units 301, 303 with slice headers in which the most significant POC portion is set to a first predetermined value and which precede, in bitstream order, a second access unit 32 of the bitstream 11 within which all NAL units 302, 304 are of an IRAP NAL unit type (e.g. CRA, IDR_W_LP, IDR_N_LP) and which have a slice header in which the most significant POC portion (POC MSB) is set to a second predetermined value, by pictures 12s which follow, in the bitstream order, the second access unit 32 of the bitstream 11, is disallowed.

Again, as mentioned above, the present subsection may describe, as a non-limiting example, a POC MSB reset by setting the POC value to zero, i.e. MSB=0. However, the value zero only acts as a placeholder to symbolize a decreasing value of MSB, e.g. it is also possible that an MSB reset could happen to any predetermined value unequal to 0 but smaller than the current MSB at the respective bitstream position. Accordingly, with respect to the example described with reference to FIG. 14, said first predetermined POC MSB value of the preceding first access unit 31 may be greater than said second predetermined POC MSB value of the succeeding second access unit 32. In this case, picture referencing would be disallowed. The other way around, one could state that, if the second predetermined MSB value of the succeeding second access unit 32 may be greater than said first predetermined POC MSB value of the preceding first access unit 31, then picture referencing would be allowed. In other words, if no POC reset occurred, then picture referencing would be allowed.

For example, said second predetermined value may be equal to zero for indicating a POC reset. Accordingly, if a POC reset occurred, then picture referencing would be disallowed. In some other examples, said second predetermined value may be equal to an implicitly derived most significant POC portion, e.g. to the regular SOTA POC MSB implicit derivation.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this disclosure has been described with reference to illustrative embodiments, this description is not intended to be construed in a limiting sense. Various modifications and combinations of the illustrative embodiments, as well as other embodiments of this disclosure, will be apparent to persons skilled in the art upon reference to the description. It is therefore intended that the appended claims encompass any such modifications or embodiments.

The invention claimed is:

1. A decoder for decoding video content, the decoder comprising:
   a processor configured to:
   decode a bitstream comprising a first sub-bitstream relating to a first spatial segment of a coded picture of the video content and a second sub-bitstream relating to a second spatial segment of the coded picture of the video content, wherein each network abstraction layer (NAL) unit of the coded picture is a non-intra random access point (IRAP) NAL unit type;
   identify that at least one first NAL unit of the first sub-bitstream is mixed with at least one different second NAL unit of the second sub-bitstream,
   wherein the non-IRAP NAL unit type of the first NAL unit of the first sub-bitstream is a random access decodable leading unit type (RADL), and
   wherein the non-IRAP NAL unit type of the second NAL unit of the second sub-bitstream is a Trailing Picture unit type (TRAIL).

2. The decoder of claim 1, wherein the processor is further configured to:
   decode a general constraint flag associated with a parameter set, the general constraint flag indicating whether mixing of NAL unit types within a picture is allowed;
   when the general constraint flag indicates that mixing NAL unit types within the picture is not allowed, determine that there are no mixed NAL unit types in the picture; and
   when the general constraint flag indicates that mixing NAL unit types within the picture is allowed, determine that mixed NAL unit types in the picture are allowed.

3. A method for decoding video content, the method comprising:
   decoding a bitstream comprising a first sub-bitstream relating to a first spatial segment of a coded picture of the video content and a second sub-bitstream relating to a second spatial segment of the coded picture of the video content, wherein each network abstraction layer (NAL) unit of the coded picture is a non-intra random access point (IRAP) NAL unit type;
   identify that at least one first NAL unit of the first sub-bitstream is mixed with at least one different second NAL unit of the second sub-bitstream,
   wherein the non-IRAP NAL unit type of the first NAL unit of the first sub-bitstream is a random access decodable leading unit type (RADL), and
   wherein the non-IRAP NAL unit type of the second NAL unit of the second sub-bitstream is a Trailing Picture unit type (TRAIL).

4. The method of claim 3, comprising:
   decoding a general constraint flag associated with a parameter set, the general constraint flag indicating whether mixing of NAL unit types within a picture is allowed;
   when the general constraint flag indicates that mixing NAL unit types within the picture is not allowed, determining that there are no mixed NAL unit types in the picture; and
   when the general constraint flag indicates that mixing NAL unit types within the picture is allowed, determining that mixed NAL unit types in the picture are allowed.

* * * * *